(12) United States Patent
Kinjou et al.

(10) Patent No.: US 9,071,149 B2
(45) Date of Patent: Jun. 30, 2015

(54) ELECTRIC POWER CONVERSION CIRCUIT

(71) Applicant: DENSO CORPORATION, Kariya, Aichi-pref. (JP)

(72) Inventors: Hirofumi Kinjou, Nagoya (JP); Keiji Shigeoka, Okazaki (JP); Yuji Hayashi, Kasugai (JP); Kenji Tomita, Aichi-ken (JP); Kimikazu Nakamura, Handa (JP)

(73) Assignee: DENSO CORPORATION, Kariya (JP)

( * ) Notice: Subject to any disclaimer, the term of this patent is extended or adjusted under 35 U.S.C. 154(b) by 230 days.

(21) Appl. No.: 13/845,963

(22) Filed: Mar. 18, 2013

(65) Prior Publication Data

US 2013/0336014 A1 Dec. 19, 2013

(30) Foreign Application Priority Data

Jun. 15, 2012 (JP) .................................. 2012-136021

(51) Int. Cl.
| | | |
|---|---|---|
| *H02M 3/335* | (2006.01) | |
| *H02M 3/337* | (2006.01) | |
| *H02M 7/5387* | (2007.01) | |

(52) U.S. Cl.
CPC ........ *H02M 3/33507* (2013.01); *H02M 3/3376* (2013.01); *H02M 7/53871* (2013.01)

(58) Field of Classification Search
USPC ........ 363/15, 16, 17, 20, 21.01, 21.04, 21.05, 363/21.1, 21.11, 21.12, 21.13, 21.18, 78, 363/95, 97, 131
See application file for complete search history.

(56) References Cited

U.S. PATENT DOCUMENTS

| | | | |
|---|---|---|---|
| 3,710,229 A * | 1/1973 | Jessee | 363/41 |
| 5,291,384 A | 3/1994 | Mammano et al. | |
| 7,660,134 B2 * | 2/2010 | Imai et al. | 363/17 |
| 8,385,085 B2 * | 2/2013 | Hattori et al. | 363/17 |
| 2005/0007794 A1 * | 1/2005 | Fukumoto | 363/16 |
| 2009/0129125 A1 | 5/2009 | Yang | |
| 2012/0229034 A1 * | 9/2012 | Yu et al. | 315/186 |

FOREIGN PATENT DOCUMENTS

| | | |
|---|---|---|
| JP | 2001-258250 | 9/2001 |
| JP | 2003-047240 | 2/2003 |
| JP | 2009-118571 | 5/2009 |
| JP | 2013-150394 | 8/2013 |

* cited by examiner

*Primary Examiner* — Jeffrey Gblende
(74) *Attorney, Agent, or Firm* — Nixon & Vanderhye PC

(57) ABSTRACT

A DC-DC converter generates PWM signals PWM1H, PWM1L on the basis of a reference signal CLK1 to drive switching elements connected in series. When generating a reset signal RST, the converter generates PWM signals PWM2H, PWM2L on the basis of the reset signal RST. When generating no reset signal, the converter generates the PWM signals PWM2H, PWM2L on the basis of a reference signal CLK2 in order to drive other switching elements connected in series. The converter generates the reset signal RST at an optional timing to the reference signal CLK1. The reference signal CLK2 is brought forward from the reference signal CLK1 by ΔT1. The PWM signals PWM1H, PWM1L are different in timing from the PWM signals PWM2H, PWM2L. This makes it possible to avoid the switching elements diagonally arranged from being simultaneously turned on and off, and suppress a switching loss, and to increase an efficiency of the converter.

12 Claims, 11 Drawing Sheets

ELECTRIC POWER CONVERSION CIRCUIT

CROSS-REFERENCE TO RELATED APPLICATION

This application is related to and claims priority from Japanese Patent Application No. 2012-136021 filed on Jun. 15, 2012, the contents of which are hereby incorporated by reference.

BACKGROUND OF THE INVENTION

1. Field of the Invention

The present invention relates to electric power conversion devices for driving switching elements on the basis of an instruction current value and a currently-flowing current value.

2. Description of the Related Art

For example, Japanese patent laid open publication No. JP 2009-118571 discloses a direct current to direct current converter (DC-DC converter) as an electric power conversion device having a conventional structure for driving switching elements on the basis of an instruction current and a currently-flowing current.

The DC-DC converter disclosed in JP 2009-118571 adjusts a drive signal on the basis of a target current and an actual current which flows in a transformer and drives transistors on the basis of the drive signal. In general, the DC-DC converter is comprised of a switching circuit, a central processing unit (CPU) a digital to analogue conversion section (D/A conversion section), a current sensor and an absolute value circuit, a comparator, a hold circuit, an AND circuit and a drive circuit.

The switching circuit is comprised of four switching elements in which a pair of two switching elements is connected in series, another pair of other two switching elements is connected in series, and the pair of the two switching elements is connected in parallel to another pair of the two switching elements. The CPU generates a target current on the basis of a difference between a target voltage and an output voltage. The D/A conversion section converts the target current generated by the CPU to a voltage. The current sensor and the absolute value circuit detect an absolute value of the current which flows in the transformer, and output a voltage corresponding to the detected absolute value. The comparator compares the target current with the actual current which flows in the transformer. A pulse output section in the CPU generates and outputs a pulse signal having a predetermined time length and a predetermined duty ratio. The holding circuit and the AND circuit adjust the drive signal to be supplied to the transistors on the basis of the comparison result of the comparator. When an absolute value of the current flowing in the transformer is smaller than the target current, the holding circuit and the AND circuit output pulse signals provided from the pulse output section as drive signals by which the transistors are driven. On the other hand, when an absolute value of the actual current which flows in the transformer is larger than the target current, the holding circuit and the AND circuit stop the output of the drive signals. The drive circuit turns on and off the transistors on the basis of the drive signal provided from the holding circuit and the AND circuit.

The drive circuit is arranged for each of the transistors which are diagonally arranged in the switching circuit. The transistors arranged at opposite angle in the switching circuit are turned on and off at the same timing on the basis of the drive signal. That is, when a hard switching process of the switching circuit is executed, this process decreases an efficiency of the DC-DC converter because of increasing the switching loss.

SUMMARY

It is therefore desired to provide an electric power conversion device capable of suppressing a switching loss and increasing an efficiency of the electric power conversion device.

An exemplary embodiment provides an electric power conversion device which is comprised of a transformer, a switching section, a current detection section, a reset signal generation section and a driving section. The transformer is comprised of a primary winding and secondary windings. The switching section is connected to the primary winding of the transformer. The switching section is comprised of switching elements in which one pair of the two switching elements connected in series are connected in parallel to another pair of the two switching elements connected in series. The current detection section detects a current flowing in one of the transformer and the switching section. The reset signal generation section generates and output a reset signal when the current detected by the current detection section exceeds an instruction current value. The driving section generates drive signals, which are used for driving the switching elements, on the basis of the reset signal when the reset signal generation section outputs the reset signal. The driving section generates drive signals on the basis of the reference signal when the reset signal generation section does not output the reset signal. The drive section is comprised of a first drive section and a second drive section. The first drive section generates a first drive signal on the basis of a timing at which a first reference signal is inverted. The first drive section drives one pair of the switching elements connected in series on the basis of the timing at which the first drive signal is inverted. The second drive section generates a second drive signal on the basis of the reset signal when the reset signal generation section outputs the reset signal, and also on the basis of a timing at which a second reference signal is inverted. The second drive section drives the other pair of the switching elements connected in series on the basis of the timing at which the second drive signal is inverted.

In the electric power conversion device having the structure previously described, the first drive section drives one pair composed of the two switching elements connected in series on the basis of the timing (or an inverting timing) at which the first drive signal is inverted. The second drive section drives the other pair composed of the two switching elements connected in series on the basis of the timing (or an inverting timing) at which the second drive signal is inverted. The first drive signal is generated on the basis of the timing (or an inverting timing) at which the first reference signal is inverted. When the reset signal is outputted, the second drive signal is generated on the basis of the reset signal. The reset signal is generated when a current flowing in the transformer or the switching section exceeds the instruction current value. That is, the reset signal is optionally outputted at the timing as an inverting timing of the first reference signal at which the first reference signal is inverted. Accordingly, when the reset signal is outputted, the first drive signal and the second drive signal have a different inverting timing, respectively. This makes it possible to avoid the switching elements diagonally arranged in the switching section from being turned on and off simultaneously. This decreases a switching loss in the electric power conversion device, and increases an efficiency of the electric power conversion device.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
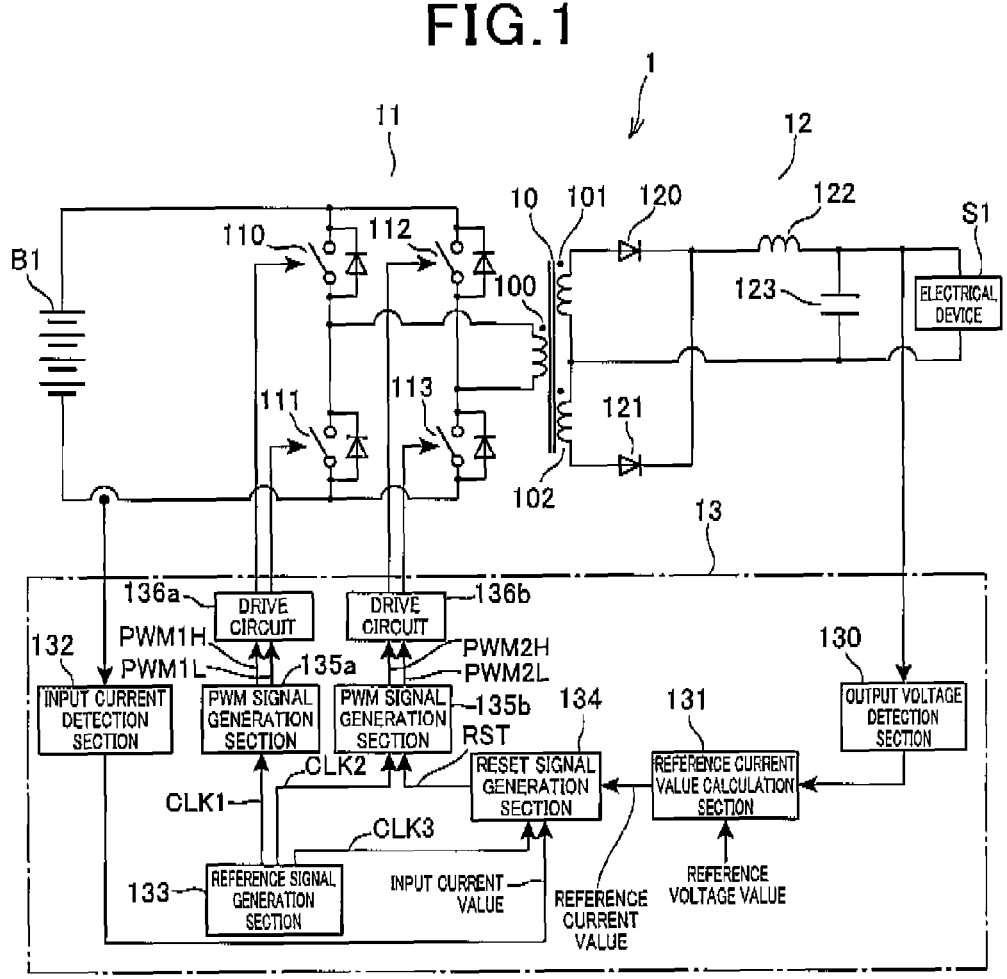
FIG. 1 is a view showing a circuit configuration of a DC-DC converter according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of a voltage conversion device according to a first exemplary embodiment with reference to FIG. 1 to FIG. 4.

The first exemplary embodiment discloses a case in which a concept of the voltage conversion device is applied to a direct current to direct current converter (DC-DC converter) 1 which insulates an on-vehicle battery from an electronic device mounted to a motor vehicle. The DC-DC converter 1 is capable of decreasing a voltage supplied from the on-vehicle battery and supplying the decreased voltage to the electronic device.

FIG. 1 is a view showing a circuit configuration of the DC-DC converter 1 according to the first exemplary embodiment.

The DC-DC converter 1 shown in FIG. 1 which insulate a battery B1 from an electronic device S1, and decreases a direct current voltage (DC voltage) of the battery B1. The DC-DC converter 1 transmits the decreased DC voltage to an electric device S1 mounted to a motor vehicle. The DC voltage supplied from the battery B1 is insulated from the electronic device S1. The DC-DC converter 1 is comprised of an input side circuit 11 (as a switching section) and an output side circuit 12 and a control device 13. The DC-DC converter 1 according to the first exemplary embodiment decreases the DC voltage supplied from the battery B1, and supplies the decreased voltage to the electronic device S1 while the input side circuit 11 is insulated from the output side circuit 12.

The transformer 10 is comprised of a primary winding 100 as a primary side and secondary windings 101 and 102 as a secondary side. The transformer 10 inputs an AC voltage and outputs a decreased AC voltage to external devices. The primary winding 100 of the transformer 10 inputs an AC voltage, and the secondary windings 101 and 102 decrease the AC voltage to different AC voltages, respectively. The AC voltage is insulated between the primary winding 100 and the secondary windings 101 and 102 in the transformer 10.

A winding ratio between the primary winding 100 and the secondary winding 101 is n1, and a winding ratio between the primary winding 100 and the secondary winding 102 is n2. That is, these winding ratios n1 and n2 have a relationship of n1>n2. One end and the other end of the primary winding 100 are connected to the input side circuit 11. The secondary windings 101 and 102 are connected in series together. Specifically, one end terminal (or a first end terminal) of the secondary winding 101 is connected to one end terminal (or a first end terminal) of the secondary winding 102.

The other end terminal (or a second end terminal) of the secondary winding 101 and the other end terminal (or a second end terminal) of the secondary winding 102, and the connection node between the primary winding 100 and the secondary windings 101 and 102 connected in series are connected to the output side circuit 12.

The input side circuit 11 is connected between the primary winding 100 and the battery B1. The input side circuit 11 converts a DC voltage to an AC voltage and supplies the converted AC voltage to the primary winding 100 of the transformer 10. The input side circuit 11 is comprised of switching elements 110, 111, 112, and 113. In the input side circuit 11, the switching elements 110 and 111 are connected in series, and the switching elements 112 and 113 are connected in series. The switching elements 110 and 111 form a pair. The switching elements 112 and 113 form a pair.

The switching elements 110, 111, 112 and 113 are elements to convert a DC voltage supplied from the battery B1 to an AC voltage, and to output the AC voltage to the primary winding 100. As shown in FIG. 1, the switching elements 110 and 111 are connected in series, and the switching elements 112 and 113 are connected in series. Specifically, one end terminal (as a first end terminal) of the switching element 110 is connected to one end terminal (as a first end terminal) of the switching element 111, and one end terminal (as a first end terminal) of the switching element 112 is connected to one end terminal (as a first end terminal) of the switching element 113.

The pair of the switching elements 110 and 111 is connected in parallel to the pair of the switching elements 112 and 113. Further, the pair of the switching elements 110 and 111 and the pair of the switching elements 112 and 113 are connected to the battery B1. In more detail, the other end terminal (as a second end terminal) of each of the switching elements 110 and 112 is connected to a positive electrode terminal of the battery B1, and the other end terminal (as a second end terminal) of each of the switching elements 111 and 113 is connected to a negative electrode terminal of the battery B1.

A series connection node between the switching elements 110 and 111 connected in series is connected to one end terminal (as a first end terminal) of the primary winding 100 of the transformer 10. A series connection node between the switching elements 112 and 113 connected in series is connected to the other end terminal (as a second end terminal) of the primary winding 100 of the transformer 10. A control terminal of each of the switching elements 110, 111, 112 and 113 is connected to the control device 13.

The output side circuit 12 is connected between the secondary windings 101 and 102 and the electric device S1. The output side circuit 12 converts a DC voltage supplied from each of the secondary windings 101 and 102 to a DC voltage, and outputs the converted DC voltage to the electric device S1. The output side circuit 12 is comprised of a diode 120, a diode 121, a coil 122 and a capacitor 123.

The diodes 120 and 121 are connected to the secondary windings 101 and 102, respectively. The diodes 120 and 121 rectify the AC voltage supplied from the secondary windings 101 and 102, respectively. An anode terminal of the diode 120 is connected to the other end terminal (or a second end terminal) of the secondary winding 101, and a cathode of the diode 120 is connected to the coil 122. On the other hand, an anode terminal of the diode 121 is connected to the other end terminal (or a second end terminal) of the secondary winding 102, and a cathode of the diode 121 is connected to the coil 122.

The coil 122 and the capacitor 123 smooth the DC voltage which is converted by the diodes 120 and 121. One end terminal of the coil 122 is connected to the cathode of the diode 120 and the cathode of the diode 121. The other end terminal (or a second end terminal) of the coil 122 is connected to one end terminal (or a first end terminal) of the capacitor 123. The other end terminal (or a second end terminal) of the capacitor 123 is connected to a series connection node between the secondary windings 101 and 102. Further, one end terminal of the capacitor 123 is connected to the positive electrode terminal of the electric device S1. The other end terminal of the capacitor 123 is connected to the negative electrode terminal of the electric device S1.

The control circuit 13 controls the input side circuit 11 so that the output voltage of the output side circuit 12 becomes equal to a reference voltage value which is determined in advance. The control circuit 13 is comprised of an output voltage detection section 130, a reference current value calculation section 131, an input current detection section 132 (as a current detection section), a reference signal generation section 133, a reset signal generation section 134, PWM signal generation sections 135a and 135b (as drive signal generation sections), and drive circuits 136a and 136b (as drive sections).

The output voltage detection section 130 detects the output voltage which is supplied from the output side circuit 12 to the electric device S1. The output voltage detection section 130 converts the output voltage supplied from the output side circuit 12 to a predetermined voltage. The output voltage detection section 130 is connected to an output terminal of the output side circuit 12. In more detail, the output voltage detection section 130 is connected to one end terminal of the capacitor 123. As shown in FIG. 1, the output voltage detection section 130 is also connected to the reference current value calculation section 131.

The reference current value calculation section 131 converts the output voltage of the output voltage detection section 130 to digital data items. The reference current value calculation section 131 determines a reference current value (as an instruction current value) on the basis of the digital data items of the converted output voltage and digital data items of a reference voltage value which is determined in advance. The reference current value calculation section 131 converts the determined reference current value to a predetermined voltage, and outputs the obtained predetermined voltage. In more detail, the reference current value calculation section 131 executes a proportional integral of a difference between the output voltage value and the reference voltage value, and determines a reference current value, and converts the reference current value to a predetermined voltage which corresponds to the converted reference current value. The reference current value calculation section 131 outputs the predetermined voltage as the reference current value. The reference current value calculation section 131 is connected to the output voltage detection section 130. As shown in FIG. 1, the reference current value calculation section 131 is also connected to the reset signal generation section 134.

The input current detection section 132 detects the input current which is supplied from the battery B1 to the input side circuit 11, and determines a predetermined voltage which corresponds to the detected input current. The input current detection section 132 outputs the predetermined voltage as the detected input current.

The input current detection section 132 is connected to the current sensor arranged at the input side of the input side circuit 11. Specifically, the input current detection section 132 is connected to the current sensor arranged at a wiring through which the switching elements 111 and 113 are connected to the battery B1. As shown in FIG. 1, the input current detection section 132 is also connected to the reset signal generation section 134.

The reference signal generation section 133 generates and outputs reference signals CLK1, CLK2 and CLK3. The reference signal CLK1 (as a first reference signal) is used for generates PWM signals PWM1H and PWM1L (as first drive signals). The reference signal CLK 2 (as a second reference signal) is used for generating PWM signals PWM2H and PWM2L (as second drive signals). The reference signal CLK3 is used for generating a reset signal RST. Those reference signals CLK1, CLK2 and CLK3 will be explained later in detail. As shown in FIG. 1, the reference signal generation section 133 is connected to the reset signal generation section 134 and the PWM signal generation sections 135a and 135b, respectively.

The reset signal generation section 134 generates the reset signal RST on the basis of the reference current value output from the reference current value calculation section 131, the input current value output from the input current detection section 132 and the reference signal CLK3 output from the reference signal generation section 133.

The reset signal RST is used for generating the PWM signals PWM2H and PWM2L. As shown in FIG. 1, the reset signal generation section 134 is connected to the reference current value calculation section 131, the input current detection section 132 and the reference signal generation section 133, respectively.

The PWM signal generation section 135a (as a first drive section) generates and outputs the PWM signals PWM1H and PWM1L on the basis of the reference signal CLK1 output from the reference signal generation section 133. The PWM signals PWM1H and PWM1L are used for driving the switching elements 110 and 111 connected in series. As shown in FIG. 1, the PWM signal generation section 135a is connected to the reference signal generation section 133, and the drive circuit 136a, respectively.

The PWM signal generation section 135b (as a second drive section) generates and outputs the PWM signals PWM2H and PWM2L on the basis of the reference signal CLK2 output from the reference signal generation section 133 and the reset signal RST output from the reset signal generation section 134. The PWM signals PWM2H and PWM2L are used for driving the switching elements 112 and 113 connected in series. As shown in FIG. 1, the PWM signal generation section 135b is connected to the reference signal generation section 133, the reset signal generation section 134, and the drive circuit 136b, respectively.

The drive circuit 136a (as the first drive section) executes switching of the switching elements 110 and 111 on the basis of the PWM signals PWM1H and PWM1L output from the PWM signal generation section 135a. As shown in FIG. 1, the drive circuit 136a is connected to the PWM signal generation section 135a, and a control terminal of each of the switching elements 110 and 111, respectively.

The drive circuit 136b (as the second drive section) executes switching of the switching elements 112 and 113 on the basis of the PWM signals PWM2H and PWM2L output from the PWM signal generation section 135b. As shown in FIG. 1, the drive circuit 136b is connected to the PWM signal generation section 135b, and a control terminal of each of the switching elements 112 and 113, respectively.

A description will now be given of the operation of the DC-DC converter 1 according to the first exemplary embodiment with reference to FIG. 1, FIG. 2 and FIG. 3.

The output voltage detection section 130 shown in FIG. 1 detects the output voltage which is supplied from the output side circuit 12 to the electronic device S1, and converts the detected output voltage to a predetermined voltage which corresponds to the detected output voltage. The reference current value calculation section 131 converts the output voltage of the output voltage detection section 130 to digital data items. The reference current value calculation section 131 executes a proportional integral of a difference between the digital data items and a reference voltage value in digital form which is determined in advance in order to obtain a reference current value. The reference current value calculation section 131 converts the obtained reference current value to a predetermine voltage which corresponds to the obtained reference current value. The reference current value calculation section 131 outputs the predetermined voltage value.

The input current detection section 132 detects an input current supplied from the battery B1 to the input side circuit 11, and converts the detected input current to a predetermined voltage which corresponds to the detected input current. The reference signal generation section 133 generates and outputs the reference signals CLK1, CLK2 and CLK3.

Figure 2:
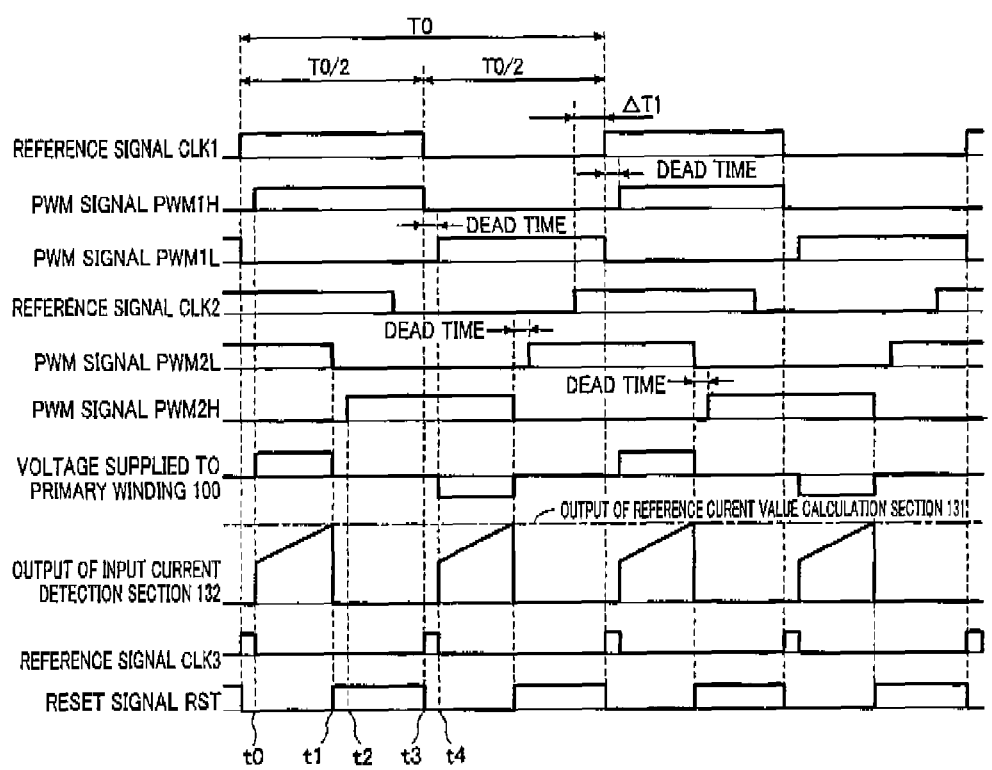
FIG. 2 is a view showing a timing chart for explaining the operation of the DC-DC converter shown in FIG. 1.

FIG. 2 is a view showing a timing chart for explaining the operation of the DC-DC converter 1 shown in FIG. 1. FIG. 3 is a view showing another timing chart for explaining the operation of the DC-DC converter 1 shown in FIG. 1. Specifically, as shown in FIG. 2 and FIG. 3, the reference signal generation section 133 generates the reference signal CLK1 having a predetermined timing T0 composed of a high level T0/2 and a low level T0/2. The reference signal generation section 133 further generates the reference signal CLK2 which is brought forward from the reference signal CLK1 by $\Delta T1$ (a predetermined time length). That is, a rising timing and a falling timing of the reference signal CLK2 are faster than the reference signal CLK1 by $\Delta T1$. The reference signal generation section 133 further generates the reference signal CK3 has a high level having a predetermined time length at each of the rising timing and the falling timing of the reference signal CLK1.

In the DC-DC converter 1 shown in FIG. 1, it is set so that the time length $\Delta T1$ (or the period $\Delta T1$) has a time length which is more than a sum of a dead time and an on-delay time of the switching elements 112 and 113. The dead time is used for turning off the switching element 112 and the switching element 113 simultaneously. The on-delay time is a time length from a time when the drive circuit turns on the switching element to a time when the switching element enters a completely turned-on state.

The reset signal generation section 134 shown in FIG. 1 generates and outputs the reset signal RST on the basis of the reference current value output from the reference current value calculation section 131, the input current value output from the input current detection section 132 and the reference signal CLK3 output from the reference signal generation section 133. As shown in FIG. 2, the reset signal RST has a high level while the input current value exceeds the reference current value. After this, the reset signal RST has a low level in synchronization with a rising timing of the reference signal CLK3.

The PWM signal generation section 135a generates and outputs the PWM signals PWM1H and PWM1L on the basis of a timing at which the reference signal CLK1 output from the reference signal generation section 133 is logically inverted. The PWM signals PWM1H and PWM1L are used for switching the switching elements 110 and 111. Specifically, as shown in FIG. 2 and FIG. 3, the PWM signal generation section 135a generates and outputs the PWM signal PWM1H. The PWM signal PWM1H has a high level after the elapse of the dead time counted from the rising timing of the reference signal CLK1, and becomes a low level at a next falling timing of the reference signal CLK1. Further, the PWM signal generation section 135a generates and outputs the PWM signal PWM1L. The PWM signal PWM1L has a high level after the elapse of the dead time counted from the falling timing of the reference signal CLK1, and becomes a low level at a next rising timing of the reference signal CLK1. After this, the PWM signal generation section 135a continuously generates and outputs the PWM signals PWM1H and PWM1L by the same method.

The PWM signal generation section 135b in the DC-DC converter 1 shown in FIG. 1 generates and outputs the PWM signals PWM2H and PWM2L on the basis of a timing at which the reference signal CLK2 output from the reference signal generation section 133 is logically inverted and the reset signal RST output from the reset signal generation section 134. The PWM signals PWM2H and PWM2L are used for switching the switching elements 112 and 113. Specifically, as shown in FIG. 2, the PWM signal generation section 135b generates and outputs the PWM signal PWM2H. The PWM signal PWM2H has a high level after the elapse of the dead time counted from a rising timing of the reset signal RST when the PWM signal PWM2L is a high level and the reset signal generation section 134 generates the reset signal RST. The PWM signal PWM2H has a low level at a next rising timing of the reset signal RST.

Further, the PWM signal generation section 135b generates and outputs the PWM signal PWM2L. The PWM signal PWM2L has a high level after the elapse of the dead time counted from a rising timing of the reset signal RST when the PWM signal PWM2H is a high level and the reset signal generation section 134 generates the reset signal RST. The PWM signal PWM2L has a low level at a next rising timing of the reset signal RST.

Figure 3:
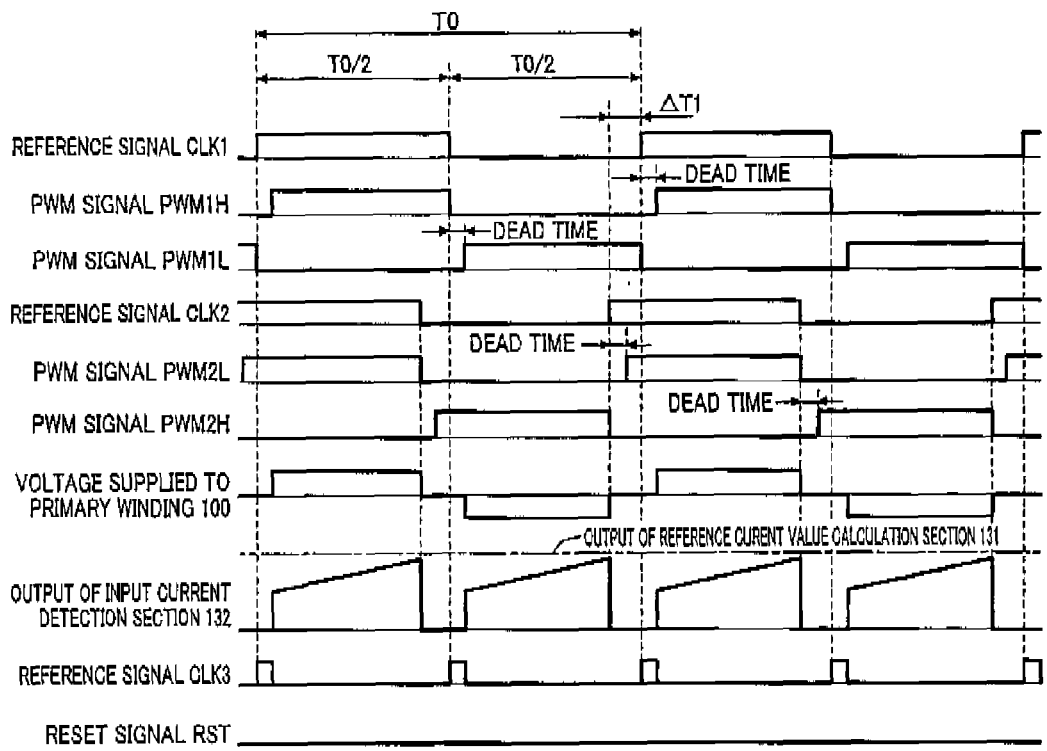
FIG. 3 is a view showing another timing chart for explaining the operation of the DC-DC converter shown in FIG. 1.

Further, as shown in FIG. 3, the PWM signal generation section 135*b* generates and outputs the PWM signal PWM2H having a high level after the elapse of the dead time counted from a falling timing of the reference signal CLK2 when the reset signal generation section 134 does not output the reset signal RST. The PWM signal PWM2H having a low level at a next rising timing of the reference signal CLK2.

Still further, the PWM signal generation section 135*b* generates and outputs the PWM signal PWM2L having a high level after the elapse of the dead time counted from a rising timing of the reference signal CLK2 when the reset signal generation section 134 does not output the reset signal RST. The PWM signal PWM2L having a low level at a next falling timing of the reference signal CLK2. After this, the PWM signal generation section 135*b* continuously generates and outputs the PWM signals PWM2H and PWM2L by the same method.

The drive circuit 136*a* shown in FIG. 1 executes the switching of the switching elements 110 and 111 on the basis of an inverting timing of a logical value of the PWM signals PWM1H and PWM1L output from the PWM signal generation section 135*a*. Specifically, as shown in FIG. 2 and FIG. 3, the drive circuit 136*a* turns on the switching elements 110 and 111 when the PWM signals PWM1H and PWM1L have a high level, respectively.

The drive circuit 136*b* shown in FIG. 1 executes the switching of the switching elements 112 and 113 on the basis of an inverting timing of a logical value of the PWM signals PWM2H and PWM2L output from the PWM signal generation section 135*b*. Specifically, as shown in FIG. 2 and FIG. 3, the drive circuit 136*b* turns on the switching elements 112 and 113 when the PWM signals PWM2H and PWM2L have a high level, respectively.

This makes it possible to convert the DC voltage supplied from the battery B1 to an AC voltage. The converted AC voltage is supplied to the primary winding 100 of the transformer 10. When the AC voltage is supplied to the primary winding 100 of the transformer 10, the secondary windings 101 and 102 output different decreased AC voltages, respectively. The output side device 12 converts the AC voltage supplied from each of the secondary windings 101 and 102 of the transformer 10 to a DC voltage, and supplies the DC voltage to the electronic device S1.

Next, a description will now be given of the process of generating the PWM signals PWM1H, PWM1L, PWM2H and PWM2L in detail.

The PWM signal generation section 135*a* detects whether or not the reference signal CLK1 has a high level. When the detection result indicates affirmation, namely that the reference signal CLK1 has a high level, the PWM signal generation section 135*a* sets the PWM signal PWM1L to a low level. Further, the PWM signal generation section 135*a* sets the PWM signal PWM1H to a high level after the elapse of the dead time counted from the time when the PWM signal PWM1L is set to the low level.

The reset signal generation section 134 detects whether or not the reference signal CLK3 is rising. When the detection result indicates affirmation, namely that the reference signal CLK3 has risen, the reset signal generation section 134 sets the reset signal RST to a low level.

After this, the PWM signal generation section 135*b* detects whether the PWM signal PWM2L is a high level and the reset signal RST is a high level, or whether the reference signal CLK2 is a low level. When the detection result indicates affirmation, namely, the PWM signal PWM2L has a high level and the reset signal RST has a high level, or the reference signal CLK2 has a low level, the PWM signal generation section 135*b* sets the PWM signal PWM2L to a low level. Further, the PWM signal generation section 135*b* sets the PWM signal PWM2H to a high level after the elapse of the dead time counted from the time when the PWM signal PWM2L is set to the low level.

After this, the PWM signal generation section 135*a* detects whether or not the reference signal CLK1 has a low level. When the detection result indicates affirmation, namely that the reference signal CLK1 has a low level, the PWM signal generation section 135*a* sets the PWM signal PWM1H to a low level. Further, the PWM signal generation section 135*a* sets the PWM signal PWM1L to a high level after the elapse of the dead time counted from the time when the PWM signal PWM1H is set to the low level.

The reset signal generation section 134 detects whether or not the reference signal CLK3 is rising. When the detection result indicates affirmation, namely that the reference signal CLK3 has risen, the reset signal generation section 134 sets the reset signal RST to a low level.

After this, the PWM signal generation section 135*b* detects whether the PWM signal PWM2H is a high level and the reset signal RST is a high level, or whether the reference signal CLK2 is a high level. When the detection result indicates affirmation, namely, when the PWM signal PWM2H has a high level and the reset signal RST has a high level, or when the reference signal CLK2 has a high level, the PWM signal generation section 135*b* sets the PWM signal PWM2H to a low level. Further, the PWM signal generation section 135*b* sets the PWM signal PWM2L to a high level after the elapse of the dead time counted from the time when the PWM signal PWM2H is set to the low level. The process regarding the generation of the PWM signals PWM1H, PWM1L, PWM2H and PWM2L described above is continuously repeated.

This makes it possible to continuously generate and output the PWM signals PWM1H, PWM1L, PWM2H and PWM2L by the process previously described.

When the reset signal generation section 134 outputs the reset signal RST at the timing t0 shown in FIG. 2, the PWM signals PWM1H and PWM1L are set to a high level, respectively. At the timing t1 after the timing t0, the PWM signal PWM2L is set to a low level. At the timing t2 after the elapse of the dead time, the PWM signal PWM1H is set to a low level. Further, at the timing t4 after the elapse of the dead time, the PWM signal PWM2L is set to a high level.

In this case, both the switching elements 110 and 113 are turned on at the timing to, and a current starts to flow in the primary winding 100 of the transformer 10. As previously described and shown in FIG. 1, the switching elements 110 and 113 are diagonally arranged in the input side circuit 11 as the switching section. After this, the switching element 113 is only turned off at the timing U. This makes a current path composed of the primary winding 100, the switching element 112 and the switching element 110. In the current path, a current flows from the primary winding 100 and returns to the primary winding 100 through the switching elements 112 and 110. This current path makes it possible to discharge electrical charges as an output capacity of the switching element 112 by using a leaked inductance of the transformer 10. Accordingly, it is possible to execute a zero point switching when the switching element 112 is turned on at the timing t2.

After this, the switching element 110 is turned off at the timing t3. This makes a current path composed of the primary winding 100, the switching element 112, the battery B1, and the switching element 111. In the current path, a current flows from the primary winding 100 to the primary winding 100 through the switching element 112, the battery B1, and the switching element 111. This current path makes it possible to discharge electrical charges as an output capacity of the switching element 111 by using a leaked inductance of the transformer 10. Accordingly, it is possible to execute a zero point switching when the switching element 112 is turned on at the timing t2. Accordingly, it is possible to execute a zero point switching when the switching element 111 is turned on at the timing t4.

Similar to the switching element 111 and the switching element 112 previously described, it is possible to execute the zero point switching when each of the switching element 110 and the switching element 113. As shown in FIG. 3, it is possible to execute the zero point switching when the reset signal generation section 134 does not output the reset signal RST, and each of the switching elements 110, 111, 112 and 113 is turned on.

A description will now be given of the effects of the DC-DC converter 1 according to the first exemplary embodiment.

In the structure of the DC-DC converter 1 according to the first exemplary embodiment, the PWM signal generation section 135a generates and outputs the PWM signals PWM1H and PWM1L at a timing to invert the level of the reference signal CLK1. The drive section 136a executes the switching of the switching elements 110 and 111 connected in series at a timing to invert the level of the PWM signals PWM1H and PWM1L. The PWM signal generation section 135b generates and outputs the PWM signals PWM2H and PWM2L on the basis of the reset signal RST when the reset signal generation section 134 outputs the reset signal RST or on the basis of a timing to invert the level of the reference signal CLK2 when the reset signal generation section 134 does not output the reset signal RST. The drive section 136b executes the switching of the switching elements 112 and 113 connected in series at a timing to invert the level of the PWM signals PWM2H and PWM2L. That is, the drive section 136a executes the switching of the switching elements 110 and 111 connected in series on the basis of the timing to invert the logical level of the PWM signals PWM1H and PWM1L. The drive section 136b executes the switching of the switching elements 112 and 113 connected in series on the basis of the timing to invert the logical level of the PWM signals PWM2H and PWM2L.

The PWM signals PWM1H and PWM1L are generated on the basis of the timing to invert the logical level of the reference signal CLK1. When the reset signal generation section 134 outputs the reset signal RST, the PWM signals PWM2H and PWM2L are generated on the basis of the reset signal RST. The reset signal generation section 134 generates and outputs the rest signal RST when an input current flowing into the input side circuit 11 exceeds a reference current value. That is, the reset signal generation section 134 outputs the reset signal RST at an optional timing to the timing to invert the logical level of the reference signal CLK1. Accordingly, as shown in FIG. 2, when the reset signal generation section 134 outputs the reset signal RST, the PWM signals PWM1H and PWM1L have a different timing to invert its logical level from the PWM signals PWM2H and PWM2L. This means that the switching elements which are diagonally arranged in the input side circuit 11 as the switching section do not have the same timing to be turned on and off. This makes it possible to suppress a switching loss and to increase and improve the efficiency of the DC-DC converter 1.

As shown in FIG. 3, the DC-DC converter 1 according to the first exemplary embodiment uses the reference signal CLK2 which is brought forward from the reference signal CLK1 by a time ΔT1. This makes it possible to generate a different timing between a group of the PWM signals PWM1H and a group of PWM1L and the PWM signals PWM2H and PWM2L even if the reset signal generation section 134 does not output the reset signal RST. Accordingly, the switching elements which are diagonally arranged in the input side circuit 11 as the switching section are not turned on and off at the same timing when the reset signal generation section 134 does not output the reset signal RST. This makes it possible to suppress a switching loss of the switching elements regardless of the presence of the reset signal RST.

Figure 4:
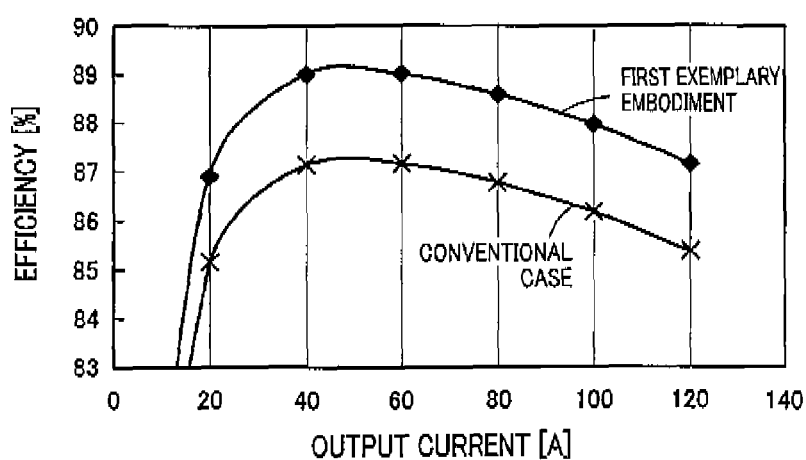
FIG. 4 is a view showing a graph indicating a relationship between an output current and an efficiency of the DC-DC converter shown in FIG. 1.

FIG. 4 is a view showing a graph indicating a relationship between an output current and an efficiency of the DC-DC converter 1 according to the first exemplary embodiment shown in FIG. 1 and a conventional DC-DC converter.

As shown in FIG. 4, the DC-DC converter 1 according to the first exemplary embodiment can have an improved efficiency as compared with a conventional DC-DC converter having a conventional structure in which switching elements diagonally arranged in the input side circuit 11 as the switching section are turned on and off at the same timing. Further, it is possible for the DC-DC converter 1 according to the first exemplary embodiment to decrease a switching surge caused by an inductance component in the switching elements. This makes it possible to suppress a switching loss and to decrease a switching cost of the DC-DC converter.

According to the first exemplary embodiment, the time ΔT1, as previously described, has a value which is greater than a sum of the dead time for turning off the switching elements 112 and 113 simultaneously and an on-delay time of the switching elements 112 and 113. Accordingly, even if the switching element has an extremely high duty ratio of the off period thereof, it is possible to significantly delay the switching timing of the switching elements 110 and 111 and the switching timing of the switching elements 112 and 113 as compared with the on-delay time.

Accordingly, even if the switching elements operate at a high duty ratio, it is possible to avoid the switching elements diagonally arranged in the input side circuit 11 as the switching section from being turned on and off at the same timing. This makes it possible to suppress the switching loss of the switching elements and to increase the efficiency of the DC-DC converter 1.

Second Exemplary Embodiment

A description will be given of a DC-DC converter 2 as a voltage conversion device according to a second exemplary embodiment with reference to FIG. 5 and FIG. 6.

Figure 5:
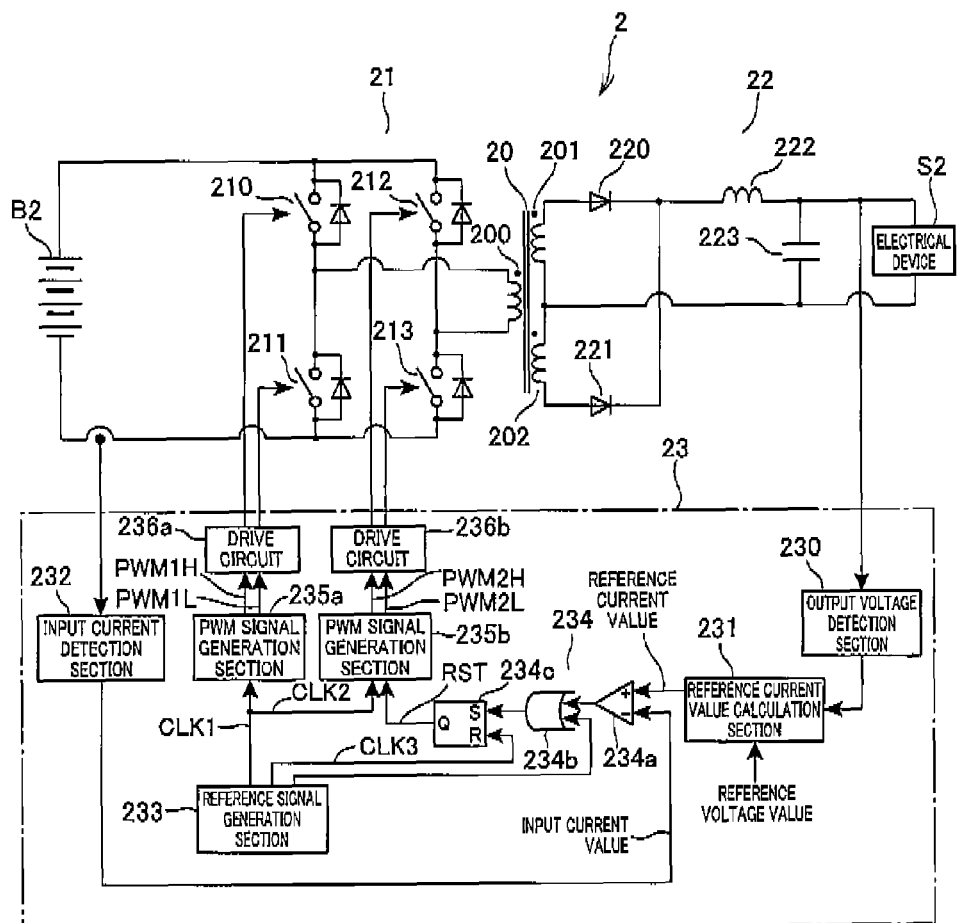
FIG. 5 is a view showing a circuit configuration of a DC-DC converter according to a second exemplary embodiment of the present invention.

FIG. 5 is a view showing a circuit configuration of the DC-DC converter 2 according to the second exemplary embodiment.

The DC-DC converter 2 uses the reference signals CLK1 and CLK2 which have the same value. In the DC-DC converter 2, a reset signal RST is forcedly output at a predetermined timing. Other components of the DC-DC converter 2 are the same of the components in the DC-DC converter 1.

A description will now be given of the structure of the DC-DC converter 2 according to the second exemplary embodiment with reference to FIG. 5.

The DC-DC converter 2 (as an electric power conversion device) shown in FIG. 5 is a full bridge type converter for decreasing the DC voltage supplied from a battery B2, and a decreased voltage is supplied to the electronic device S2 mounted to a motor vehicle. The DC voltage supplied from the battery B2 is insulated from the electronic device S2. The DC-DC converter 2 is comprised of a transformer 20, an input side circuit 21 (as a switching section), an output side circuit 22, and a control circuit 23. Thus, the DC-DC converter 2 according to the second exemplary embodiment decreases the DC voltage supplied from the battery B2, and supplies the decreased voltage to the electronic device S2 while the input side circuit 21 is insulated from the output side circuit 22.

The transformer 20 is comprised of a primary winding 200, a secondary winding 201 and a secondary winding 202. That is, the transformer 20 used in the DC-DC converter 2 has the same structure of the transformer 10 used in the DC-DC converter 1 according to the first exemplary embodiment.

The input side circuit 21 is comprised of switching elements 210, 211, 212 and 213. The input side circuit 21 has the same structure of the input side circuit 11 used in the DC-DC converter 1 according to the first exemplary embodiment.

The output side circuit 22 is comprised of a diode 220, a diode 221, a coil 222 and a capacitor 223. The output side circuit 22 has the same structure of the input side circuit 12 used in the DC-DC converter 1 according to the first exemplary embodiment.

The control circuit 23 is comprised of an output voltage detection section 230, a reference current value calculation section 231, an input current detection section 232 (as a current detection section), a reference signal generation section 233, a reset signal generation section 234, PWM signal generation sections 235a and 235b (as drive sections), and drive circuits 236a and 236b (as the drive sections).

The output voltage detection section 230, the reference current value calculation section 231 and the input current detection section 232 have the same structure of the output voltage detection section 130, the reference current value calculation section 131 and the input current detection section 132 used in the DC-DC converter 1 according to the first exemplary embodiment, respectively.

The reference signal generation section 233 generates the reference signals CLK1, CLK2, CLK3 and CLK4. The reference signal CLK1 (first reference signal) is used for generating the PWM signals PWM1H and PWM1L (first drive signals). On the other hand, the reference signal CLK2 (second reference signal) is used for generating the PWM signals PWM2H and PWM2L (second drive signals) when the reset signal generation section 234 does not generate the reset signal RST. The reference signals CLK3 and CLK4 are used for generating the reset signal RST. As shown in FIG. 5, the reference signal generation section 233 is connected to the reset signal generation section 234 and the PWM signal generation sections 235a and 235b, respectively.

The reset signal generation section 234 generates and outputs the reset signal RST on the basis of the reference current value, the input current value and the reference signals CLK3 and CLK4. The reset signal generation section 234 is comprised of a comparison unit 234 and a OR circuit 234b and a latch circuit 234c.

The comparison unit 234a compares an output voltage of the reference current value calculation section 231 with an output voltage of the input current detection section 232. Specifically, the comparison unit 234a is a comparator. As shown in FIG. 5, an inverting input terminal (a negative terminal) of the comparison unit 234a is connected to the reference current value calculation section 231. On the other hand, a non-input terminal (a positive terminal) of the comparison unit 234a is connected to the input current detection section 232.

The OR circuit 234b calculates and outputs a logical sum of the output voltage of the comparison unit 234a and the reference signal CLK4. One terminal of the OR circuit 234b is connected to the output terminal of the comparison unit 234a. The other terminal of the OR circuit 234b is connected to the reference signal generation section 233. The output terminal of the OR circuit 234b is connected to the latch circuit 234c.

The latch circuit 234c generates and outputs the reset signal RST on the basis of the output of the OR circuit 234b and the reference signal CLK3. A set input terminal of the latch circuit 234c is connected to the output terminal of the OR circuit 234b. A reset input terminal of the latch circuit 234c is connected to the reference signal generation section 233. A Q output terminal of the latch circuit 234c is connected to the PWM signal generation section 235b.

The PWM signal generation sections 235a and 235b and the drive circuits 236a and 236b in the DC-DC converter 2 according to the second exemplary embodiment have the same structure of the PWM signal generation sections 135a and 135b and the drive circuits 136a and 136b, respectively, in the DC-DC converter 1 according to the first exemplary embodiment.

A description will now be given of the operation of the DC-DC converter 2 according to the second exemplary embodiment with reference to FIG. 5 and FIG. 6.

The output voltage detection section 230, the reference current value calculation section 231 and the input current detection section 232 in the DC-DC converter 2 shown in FIG. 5 execute the same operation of the output voltage detection section 130, the reference current value calculation section 131 and the input current detection section 132, respectively, in the DC-DC converter 1 shown in FIG. 1.

The reference signal generation section 233 generates and outputs the reference signals CLK1, CLK2, CLK3 and CLK4.

Figure 6:
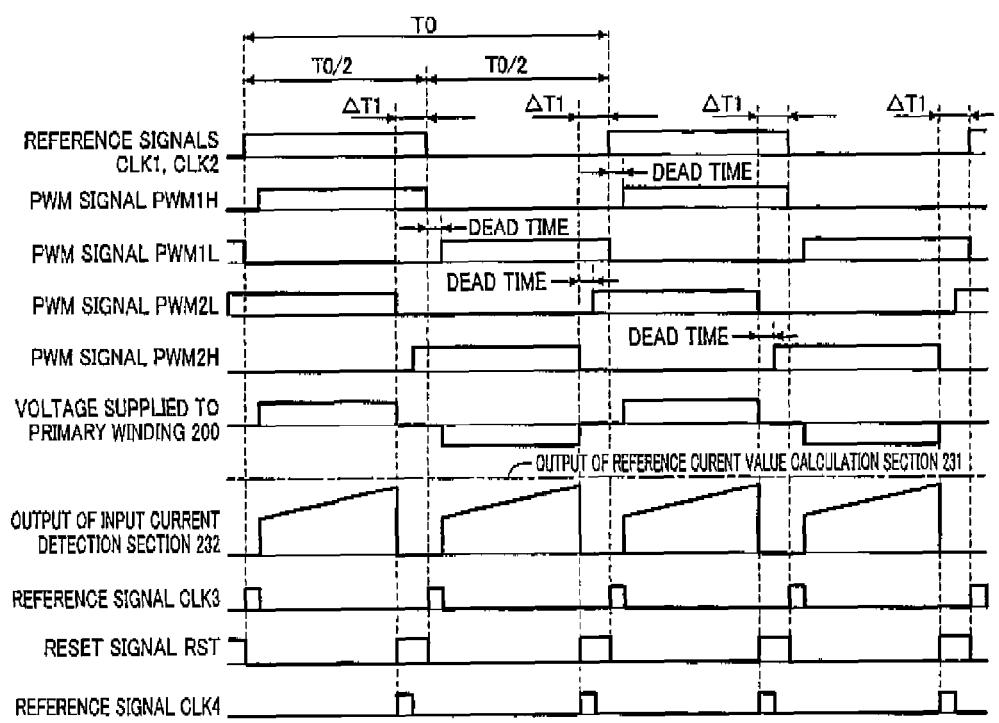
FIG. 6 is a view showing a timing chart for explaining the operation of the DC-DC converter shown in FIG. 5.

FIG. 6 is a view showing a timing chart for explaining the operation of the DC-DC converter 2 shown in FIG. 5. As shown in FIG. 6, the reference signal generation section 233 generates and outputs the reference signal CLK1 by the same method of the reference signal generation section 133 in the DC-DC converter 1 shown in FIG. 1. However, the reference signal generation section 233, which is different from the operation of the reference signal generation section 133, outputs the reference signal CLK2 which is the same as the reference signal CLK1.

Further, the reference signal generation section 233 generates and outputs the reference signal CLK3 by the same method of the reference signal generation section 133 in the DC-DC converter 1 shown in FIG. 1. The reference signal generation section 233 generates and outputs the reference signal CLK4 which has a high level during a predetermined time length which is brought forward by $\Delta T1$ to a rising timing and a falling timing of the reference signal CLK1. In the DC-DC converter 2 shown in FIG. 5, it is set so that the time length $\Delta T1$ has a time length which is larger than a sum of a dead time and an on-delay time of the switching elements 212 and 213. The dead time is used for turning off the switching element 212 and the switching element 213 simultaneously.

The reset signal generation section 234 shown in FIG. 5 generates and outputs the reset signal RST on the basis of the reference current value, t input current value, and the reference signals CLK3 and CLK4. Specifically, as shown in FIG. 6, even if the input current value is not more than the reference current value, the reset signal RST had a high level at a rising timing of the reference signal CLK4, and after this, the reset signal RST has a low level at a falling timing of the reference signal CLK3. That is, even if the input current value is not more than the reference current value, the reset signal generation section 234 forcedly generates the reset signal RST, and outputs the reset signal RST until a timing before $\Delta T1$ counted from the timing at which the reference signal CLK1 is inverted.

The PWM signal generation sections 235a and 235b and the drive circuits 236a and 236b in the DC-DC converter 2 shown in FIG. 5 a execute the same operation of the PWM signal generation sections 135a and 135b and the drive circuits 136a and 136b, respectively, in the DC-DC converter 1 shown in FIG. 1.

The DC-DC converter 2 according to the second exemplary embodiment having the structure shown in FIG. 5 decreases a DC voltage supplied from the battery B2 by using the transformer 200 which is insulated between the input side circuit 21 and the output side circuit 22. The DC-DC converter 2 can supply the decreased DC voltage to the electronic device S2 mounted to a motor vehicle (not shown).

Next, a description will now be given of a detailed explanation of generating the PWM signals PWM1H and PWM1L and the PWM signals PWM2H and PWM2L.

The PWM signal generation section 235a detects whether or not the reference signal CLK1 has a high level. When the detection result indicates affirmation, namely indicates that the reference signal CLK1 has a high level, the PWM signal generation section 235a sets the PWM signal PWM1L to a low level. After this, the PWM signal generation section 235a sets the PWM signal PWM1H to a high level after the elapse of the dead time counted from the timing at which the PWM signal PWM1L is set to a low level.

The reset signal generation section 234 detects whether or not the reference signal CLK3 is rising. When the detection result indicates affirmation, namely, indicates that the reference signal CLK3 has risen, the reset signal generation section 234 sets the reset signal RST to a low level.

After this, the reset signal generation section 234 detects whether or not the reference signal CLK4 is rising. When the detection result indicates affirmation, namely indicates that the reference signal CLK4 is rising, the reset signal generation section 234 sets the reset signal RST to a high level. On the other hand, when the detection result indicates negation, namely, indicates that the reference signal CLK4 has not risen, or when the reset signal generation section 234 sets the reset signal RST to a high level, the PWM signal generation section 235b detects whether or not the PWM signal PWM2L has a high level, and the reset signal RST has a high level. When the detection result indicates affirmation, namely, indicates that the PWM signal PWM2L has a high level, and the reset signal RST has a high level, PWM signal generation section 235b sets the PWM signal PWM2L to a low level. After this, the PWM signal generation section 235b sets the PWM signal PWM2H to a high level after the elapse of the dead time counted from the timing at which the PWM signal PWM2L is set to a low level.

On the other hand, when the detection result of the PWM signal generation section 235b indicates that the PWM signal PWM2L has a high level and the reset signal RST does not have a high level, the operation flow returns to the detection in which the reset signal generation section 234 detects whether or not the reference signal CLK4 is rising.

The PWM signal generation section 235a detects whether or not the reference signal CLK1 has a low level. When the detection result indicates affirmation, namely indicates that the reference signal CLK1 has a low level, the PWM signal generation section 235a sets the PWM signal PWM1H to a low level. After this, the PWM signal generation section 235a sets the PWM signal PWM1L to a high level after the elapse of the dead time counted from the timing at which the PWM signal PWM1H is set to a low level.

The reset signal generation section 234 detects whether or not the reference signal CLK3 is rising. When the detection result indicates affirmation, namely indicates that the reference signal CLK3 has risen, the reset signal generation section 234 sets the reset signal RST to a low level.

After this, the reset signal generation section 234 detects whether or not the reference signal CLK4 is rising. When the detection result indicates affirmation, namely indicates that the reference signal CLK4 is rising, the reset signal generation section 234 sets the reset signal RST to a high level.

On the other hand, when the detection result indicates negation, namely, indicates that the reference signal CLK4 has not risen, or when the reset signal generation section 234 sets the reset signal RST to a high level, the PWM signal generation section 235b detects whether or not the PWM signal PWM2H has a high level and the reset signal RST has a high level. When the detection result indicates affirmation, namely indicates that the PWM signal PWM2H has a high level and the reset signal RST has a high level, PWM signal generation section 235b sets the PWM signal PWM2H to a low level. After this, the PWM signal generation section 235b sets the PWM signal PWM2L to a high level after the elapse of the dead time counted from the timing at which the PWM signal PWM2H is set to a high level. the operation flow returns to the starting step of generating the PWM signals PWM1H, PWM1L, PWM2H and PWM2L.

On the other hand, when the detection result of the PWM signal generation section 235b indicates that the PWM signal PWM2H has a high level and the reset signal RST has not a high level, the operation flow returns to the detection step in which the reset signal generation section 234 detects whether or not the reference signal CLK4 is rising.

Next, a description will now be given of the effects of the DC-DC converter 2 according to the second exemplary embodiment.

As shown in FIG. 6, the DC-DC converter 2 according to the second exemplary embodiment uses the reference signal CLK2 which is the same of the reference signal CLK1. The reset signal generation section 234 forcedly generates and outputs the reset signal RST at a timing brought forward by ΔT1 from the timing at which the reference signal CLK is inverted even if the input current value is not more than the reference current value. Accordingly, even if the input current value is not more than the reference current value and no reset signal is outputted, it is possible for each of the PWM signals PWM1H, PWM1L, PWM2H and PWM2L to have a different timing at which the level thereof is inverted. This makes it possible to avoid the switching elements diagonally arranged in the input side circuit 21 as the switching section from being turned on or off simultaneously. This makes it possible to suppress the switching loss and to increase the efficiency as compared with the efficiency of a conventional structure in which switching elements diagonally arranged are turned on and off simultaneously, namely at the same timing.

Third Exemplary Embodiment

A description will be given of a DC-DC converter 3 as a voltage conversion device according to a third exemplary embodiment with reference to FIG. 7 and FIG. 8.

Figure 7:
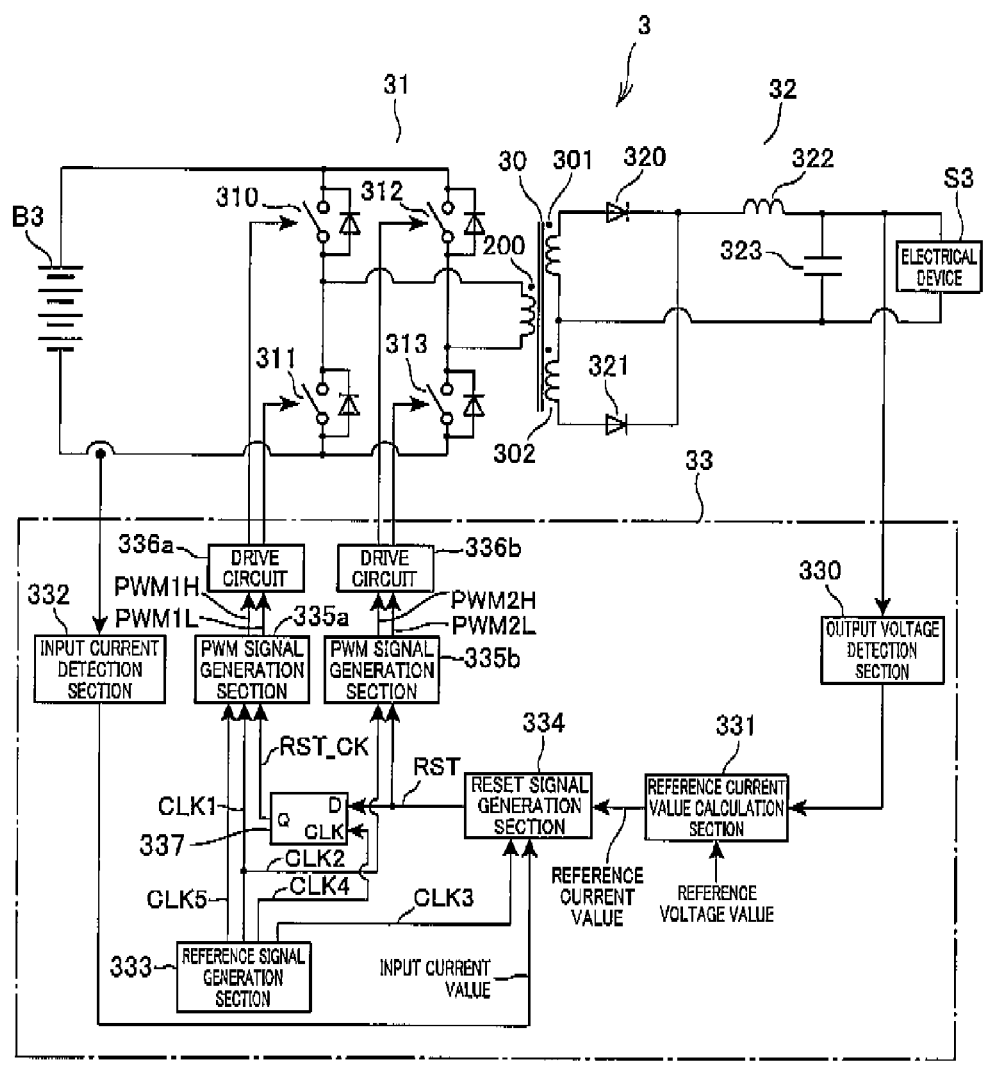
FIG. 7 is a view showing a circuit configuration of a DC-DC converter according to a third exemplary embodiment of the present invention.

FIG. 7 is a view showing a circuit configuration of the DC-DC converter 3 according to the third exemplary embodiment. The DC-DC converter 3 uses the reference signals CLK1 and CLK2 having the same value, and when no reset signal is outputted at a predetermined timing, a timing is delayed, at which each of the PWM signals PWM1H and PWM1L is Inverted.

A description will now be given of the structure of the DC-DC converter 3 according to the third exemplary embodiment with reference to FIG. 7.

The DC-DC converter 3 (as the electric power conversion device) shown in FIG. 7 is a full bridge type converter for decreasing the DC voltage supplied from a battery B3, and a decreased voltage is supplied to the electronic device S3 mounted to a motor vehicle. The DC voltage supplied from the battery B3 is insulated from the electronic device S3. The DC-DC converter 3 is comprised of a transformer 30, an input side circuit 31 (as the switching section), an output side circuit 32, and a control circuit 33. Thus, the DC-DC converter 3 according to the third exemplary embodiment decreases the DC voltage supplied from the battery B3, and supplies the decreased voltage to the electronic device S3 while the input side circuit 31 is insulated from the output side circuit 32.

The transformer 30 is comprised of a primary winding 300, a secondary winding 301 and a secondary winding 302. That is, the transformer 30 used in the DC-DC converter 3 has the same structure of the transformer 10 used in the DC-DC converter 1 according to the first exemplary embodiment. The input side circuit 31 is comprised of switching elements 310, 311, 312 and 313. The input side circuit 31 has the same structure of the input side circuit 11 used in the DC-DC converter 1 according to the first exemplary embodiment. The output side circuit 32 is comprised of a diode 320, a diode 321, a coil 322 and a capacitor 323. The output side circuit 32 has the same structure of the input side circuit 12 used in the DC-DC converter 1 according to the first exemplary embodiment.

The control circuit 33 is comprised of an output voltage detection section 330, a reference current value calculation section 331, an input current detection section 332 (as a current detection section), a reference signal generation section 333, a reset signal generation section 334, a reset signal recognition section 337 (as a first drive section), a PWM signal generation section 335a (as the first drive section), a PWM signal generation section 335b (as a second drive section), a drive circuit 336a (as a first drive section), and a drive circuit 336b (as a second drive section).

The output voltage detection section 330, the reference current value calculation section 331 and the input current detection section 332 have the same structure of the output voltage detection section 130, the reference current value calculation section 131 and the input current detection section 132, respectively used in the DC-DC converter 1 according to the first exemplary embodiment.

The reference signal generation section 333 generates the reference signals CLK1, CLK2, CLK3, CLK4 and CLK5. The reference signal CLK1 (first reference signal) and the reference signal CLK5 are used for generating the PWM signals PWM1H and PWM1L (first drive signals). On the other hand, the reference signal CLK2 (second reference signal) is used for generating the PWM signals PWM2H and PWM2L (second drive signals) when the reset signal generation section 334 does not generate the reset signal RST. The reference signal CLK3 is used for generating the reset signal RST. The reference signal CLK4 is used for generating a reset recognition signal RST_CK which will be explained later in detail. As shown in FIG. 7, the reference signal generation section 333 is connected to the reset signal generation section 334 and the PWM signal generation sections 335a and 335b, respectively.

The reset signal generation section 334 has the same structure of the reset signal generation section 134 used in the DC-DC converter 1 according to the first exemplary embodiment.

The reset signal recognition section 337 detects the reset signal TSR output from the reset signal generation section 334 on the basis of the reset signal RST and the reference signal CLK4. When detecting the presence of the reset signal RST, the reset signal recognition section 337 generates and outputs the reset recognition signal RST_CK. Specifically, the reset signal recognition section 337 is a flip flop circuit. A D input terminal of the reset signal recognition section 337 is connected to the reset signal generation section 334. A CLK input terminal of the reset signal recognition section 337 is connected to the reference signal generation section 333. A Q output terminal of the reset signal recognition section 337 is connected to the PWM signal generation section 335a.

The PWM signal generation section 335a generates and outputs the PWM signals PWM1H and PWM1L on the basis of the reference signals CLK1 and CLK2 and the reset recognition signal RST_CK. The PWM signals PWM1H and PWM1L are used for executing the switching of the switching elements 310 and 311. As shown in FIG. 7, the PWM signal generation section 335a is connected to the reference signal generation section 333 and the D output terminal of the reset signal recognition section 337. Further, the PWM signal generation section 335a is connected to the drive circuit 336a.

The PWM signal generation section 335b and the drive circuits 336a and 336b have the same structure of the PWM signal generation section 135b and the drive circuits 136a and 136b, respectively, in the DC-DC converter 1 according to the first exemplary embodiment.

A description will now be given of the operation of the DC-DC converter 3 according to the third exemplary embodiment with reference to FIG. 7 and FIG. 8.

The output voltage detection section 330, the reference current value calculation section 331 and the input current detection section 332 in the DC-DC converter 3 shown in FIG. 7 execute the same operation of the output voltage detection section 130, the reference current value calculation section 131 and the input current detection section 132, respectively in the DC-DC converter 1 shown in FIG. 1.

The reference signal generation section 333 generates and outputs the reference signals CLK1, CLK2, CLK3, CLK4 and CLK5.

Figure 8:
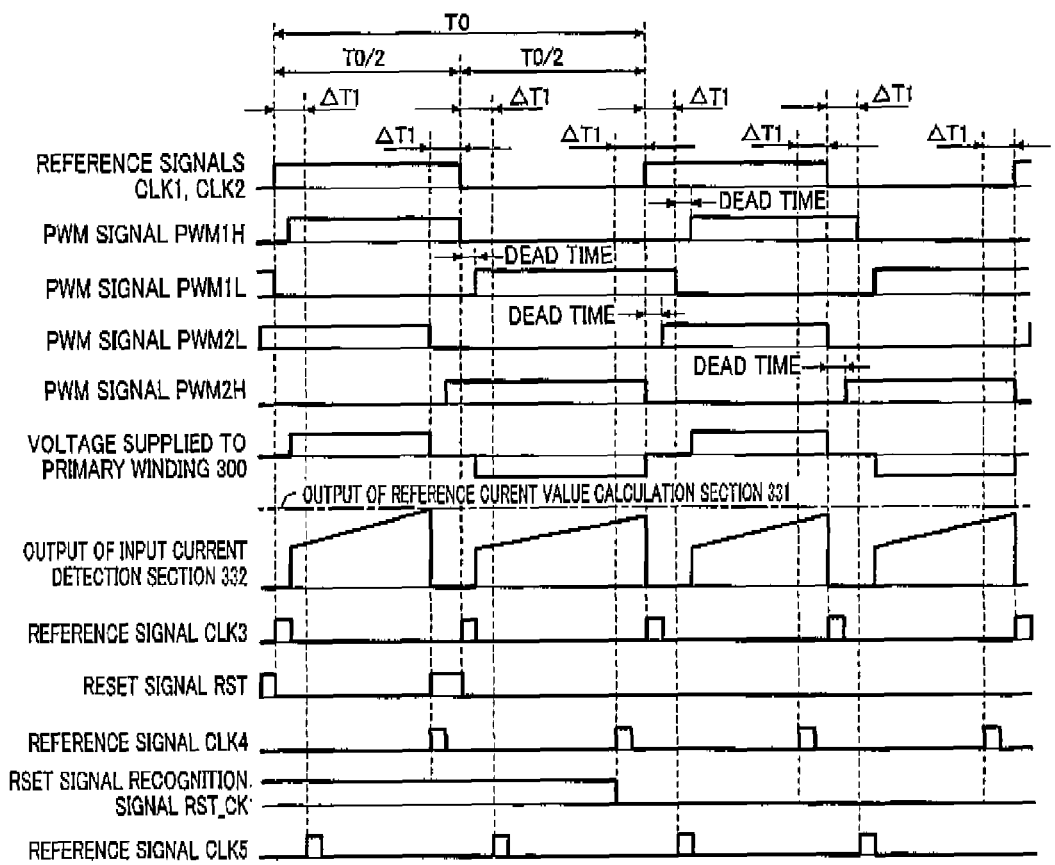
FIG. 8 is a view showing a timing chart for explaining the operation of the DC-DC converter shown in FIG. 7.

FIG. 8 is a view showing a timing chart for explaining the operation of the DC-DC converter 3 shown in FIG. 7. As shown in FIG. 8, the reference signal generation section 333 generates and outputs the reference signal CLK1 by the same method of the reference signal generation section 133 in the DC-DC converter 1 shown in FIG. 1. However, the reference signal generation section 333, which is different from the operation of the reference signal generation section 133, outputs the reference signal CLK2 which is the same as the reference signal CLK1. Further, the reference signal generation section 333 generates and outputs the reference signal CLK3 by the same method of the reference signal generation section 133 in the DC-DC converter 1 shown in FIG. 1. The reference signal generation section 333 generates and outputs the reference signal CLK4 which has a high level during a predetermined time length, which is brought forward by $\Delta T1$ to a rising timing and a falling timing of the reference signal CLK1. Further, the reference signal generation section 333 generates and outputs the reference signal CLK5 which has a high level during a predetermined time length, which is delayed from a rising timing and a falling timing of the reference signal CLK1 by $\Delta T1$.

In the DC-DC converter 3 shown in FIG. 7, it is set so that the time length $\Delta T1$ has a time length which is more than a sum of a dead time and an on-delay time of the switching elements 312 and 313. The dead time is used for turning off the switching element 312 and the switching element 313 simultaneously.

As shown in FIG. 8, the reset signal recognition section 337 in the DC-DC converter 3 shown in FIG. 7 generates the reset recognition signal RST_CK having a high level when the reset signal RST has a high level at a rising timing of the reference signal CLK4. Further, the reset signal recognition section 337 generates the reset recognition signal RST_CK having a low level when the reset signal RST has a low level at a rising timing of the reference signal CLK4.

As shown in FIG. 8, like the first exemplary embodiment, the PWM signal generation section 335a in the DC-DC converter 3 shown in FIG. 7 generates signals on the basis of the reference signal CLK1 when the reset recognition signal RST_CK is a high level. The PWM signal generation section 335a then outputs the generated signals as the PWM signals PWM1H and PWM1L.

Further, the PWM signal generation section 335a generates signals on the basis of the reference signal CLK1 when the reset recognition signal RST_CK is a low level, and delays the generated signals by ΔT1 on the basis of the reference signal CLK5. The PWM signal generation section 335a outputs the delayed signals as the PWM signals PWM1H and PWM1L. That is, when the reset signal RST is not output until a timing before ΔT1 counted from the timing at which the reference signal CLK1 is inverted, the PWM signal generation section 335a delays the timing by ΔT1, at which each of the PWM signals PWM1H and PWM1L is inverted.

The PWM signal generation section 335b and the drive circuits 336a and 336b in the DC-DC converter 3 shown in FIG. 7 execute the same operation of the PWM signal generation section 135b and the drive circuits 136a and 136b, respectively, in the DC-DC converter 1 shown in FIG. 1.

The DC-DC converter 3 according to the third exemplary embodiment having the structure shown in FIG. 7 decreases a DC voltage supplied from the battery B3 by using the transformer 300 which is insulated between the input side circuit 31 and the output side circuit 32. The DC-DC converter 3 can supply the decreased DC voltage to the electronic device S3 mounted to a motor vehicle (not shown).

Next, a description will now be given of a detailed explanation of generating the PWM signals PWM1H and PWM1L and the PWM signals PWM2H and PWM2L.

The PWM signal generation section 335a detects whether or not the reference signal CLK1 has a high level. When the detection result indicates affirmation, namely indicates that the reference signal CLK1 has a high level, the PWM signal generation section 335a detects whether or not the reset recognition signal RST_CK is a high level. When the detection result indicates negation, namely, that the reset recognition signal RST_CK does not have a high level, the PWM signal generation section 335a detects whether or not the reference signal CLK5 is rising.

When the detection result indicates that the reset recognition signal RST_CK has a high level or when the reference signal CLK5 has risen, the PWM signal generation section 335a sets the PWM signal PWM1L to a low level. After this, the PWM signal generation section 335a sets the PWM signal PWM1H to a high level after the elapse of the dead time counted from the timing at which the PWM signal PWM1L is set to a low level.

The reset signal generation section 334 detects whether or not the reference signal CLK3 is rising. When the detection result indicates affirmation, namely, indicates that the reference signal CLK3 has risen, the reset signal generation section 334 sets the reset signal RST to a low level.

After this, the PWM signal generation section 335b detects whether or not the PWM signal PWM2L has a high level and the reset signal RST has a high level, or whether or not the reference signal CLK2 is a low level. When the detection result indicates affirmation, namely, indicates that the PWM signal PWM2L has a high level and the reset signal RST has a high level or the reference signal CLK2 has a low level, the PWM signal generation section 335b sets the PWM signal PWM2L to a low level. After this, the PWM signal generation section 335b sets the PWM signal PWM2H to a high level after the elapse of the dead time counted from the timing at which the PWM signal PWM2L is set to a low level.

The reset signal recognition section 337 detects a rising timing of the reference signal CLK4. When the detection result indicates affirmation, namely indicates that the reference signal CLK4 has risen, the reset signal recognition section 337 detects whether or not the reset signal RST has a high level. When the detection result indicates affirmation, namely indicates that the reset signal RST has a high level, the reset signal recognition section 337 sets the reset recognition signal RST_CK to a high level. on the other hand, when the detection result indicates that the reset signal does not have a high level, the reset signal recognition section 337 sets the reset recognition signal RST_CK to a low level.

The PWM signal generation section 335a detects whether or not the reference signal CLK1 has a low level. When the detection result indicates affirmation, namely indicates that the reference signal CLK1 has a low level, the PWM signal generation section 335a detects whether or not the reset recognition signal RST_CK has a high level. When the detection result indicates negation, namely, indicates that the reset recognition signal RST_CK does not have a high level, the PWM signal generation section 335a detects whether or not the reference signal CLK5 is rising. When the detection result indicates that the reset recognition signal RST_CK has a high level, or indicates that the reference signal CLK5 has risen, the PWM signal generation section 335a sets the PWM signal PWM1H to a low level. After this, the PWM signal generation section 335a sets the PWM signal PWM1L to a high level after the elapse of the dead time counted from the timing at which the PWM signal PWM1H is set to a low level.

The reset signal generation section 334 detects whether or not the reference signal CLK3 is rising. When the detection result indicates affirmation, namely, indicates that the reference signal CLK3 has risen, the reset signal generation section 334 sets the reset signal RST to a low level.

After this, the PWM signal generation section 335b detects whether or not the PWM signal PWM2H has a high level and the reset signal RST has a high level, or whether or not the reference signal CLK2 is a high level. When the detection result indicates affirmation, namely, indicates that the PWM signal PWM2H has a high level and the reset signal RST has a high level or the reference signal CLK2 has a high level, the PWM signal generation section 335b sets the PWM signal PWM2H to a low level. After this, the PWM signal generation section 335b sets the PWM signal PWM2L to a high level after the elapse of the dead time counted from the timing at which the PWM signal PWM2H is set to a low level.

The reset signal recognition section 337 detects whether or not the reference signal CLK4 is rising. When the detection result indicates affirmation, namely indicates that the reference signal CLK4 has risen, the reset signal recognition section 337 detects whether or not the reset signal RST has a high level. When the detection result indicates affirmation, namely indicates that the reset signal RST has a high level, the reset signal recognition section 337 sets the reset recognition signal RST_CK to a high level. On the other hand, when the detection result indicates that the reset signal RST does not have a high level, the reset signal recognition section 337 sets the reset recognition signal RST_CK to a low level. The operation returns to the first step whether or not the reference signal CLK1 has a high level.

Next, a description will now be given of the effects of the DC-DC converter 3 according to the third exemplary embodiment.

As shown in FIG. 8, the DC-DC converter 3 according to the third exemplary embodiment uses the reference signal CLK2 which is the same of the reference signal CLK1. The reset signal recognition section 337, the PWM signal generation section 335a and the PWM signal generation section 335b delay the timing by ΔT1, at which each of the PWM signals PWM1H and PWM1L is inverted, when the reset signal generation section 334 does not generate the reset signal RST until a timing before ΔT1 counted from the timing at which the reference signal CLK1 is inverted. Accordingly, even if the reset signal RST is not output, it is possible for each of the PWM signals PWM1H, PWM1L, PWM2H and PWM2L to have a different timing at which the level thereof is inverted. This makes it possible to avoid the switching elements, which are diagonally arranged in the input side circuit 31 as the switching section, from being turned on and off simultaneously. This makes it possible to suppress the switching loss and to increase the efficiency as compared with the efficiency of a conventional structure in which switching elements diagonally arranged are turned on and off simultaneously, namely at the same timing.

Fourth Exemplary Embodiment

A description will be given of a DC-DC converter 4 as a voltage conversion device according to a fourth exemplary embodiment with reference to FIG. 9 and FIG. 10.

Figure 9:
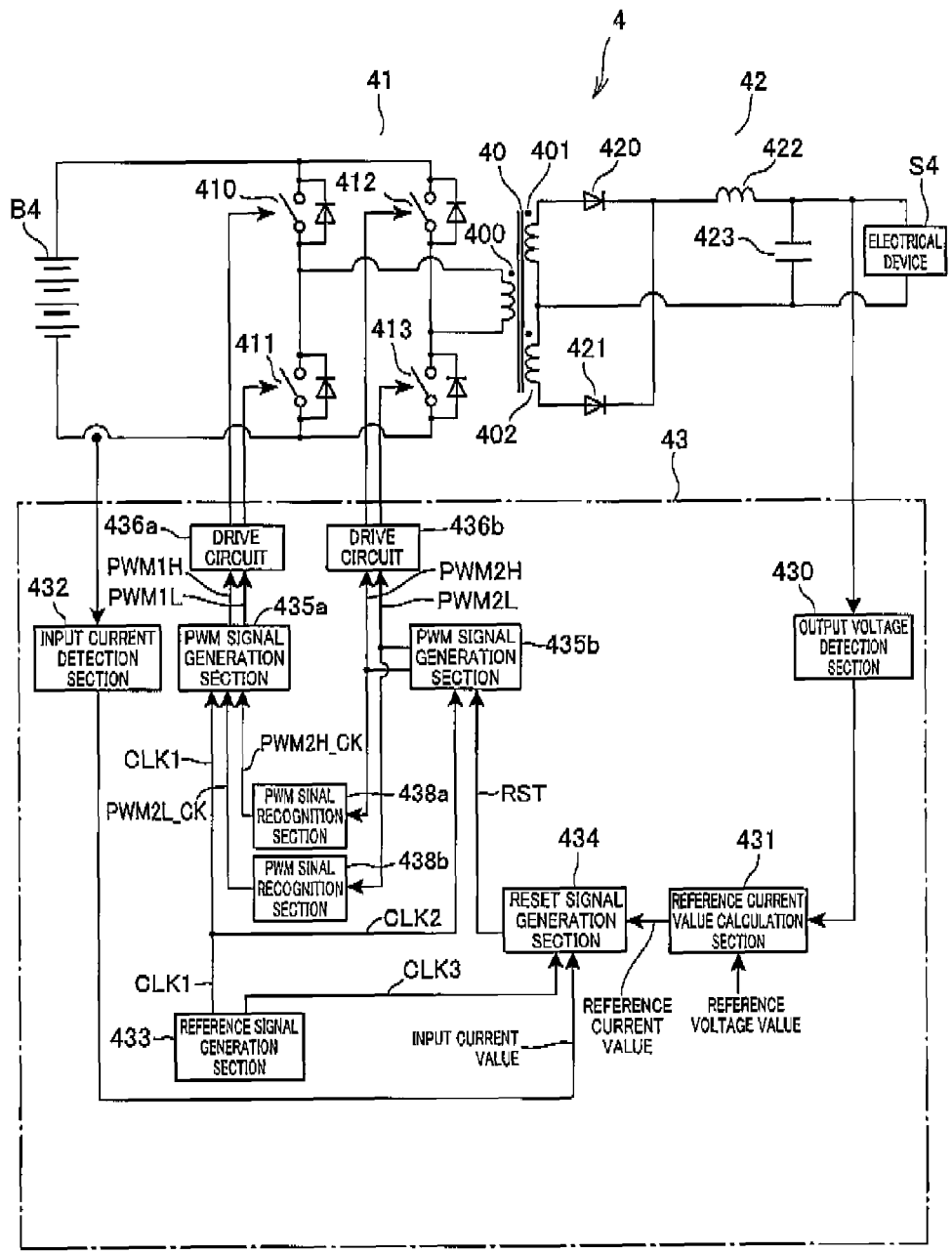
FIG. 9 is a view showing a circuit configuration of a DC-DC converter according to a fourth exemplary embodiment of the present invention.

FIG. 9 is a view showing a circuit configuration of the DC-DC converter 4 according to the fourth exemplary embodiment. The DC-DC converter 4 uses the reference signals CLK1 and CLK2 which have the same value. Further, the DC-DC converter 4 delays a timing, at which each of the PWM signals PWM1H and PWM1L is inverted, on the basis of the timing at which each of the PWM signals PWM2H and PWM2L is inverted. Each of the PWM signals PWM1H and PWM1L is used for turning off the switching elements, and each of the PWM signals PWM2H and PWM2L is used for turning on the other switching elements.

A description will now be given of the structure of the DC-DC converter 4 according to the fourth exemplary embodiment with reference to FIG. 9.

The DC-DC converter 4 (as the electric power conversion device) shown in FIG. 9 is a full bridge type converter for decreasing the DC voltage supplied from a battery B4, and a decreased voltage is supplied to the electronic device S4 mounted to a motor vehicle. The DC voltage supplied from the battery B4 is insulated from the electronic device S4. The DC-DC converter 4 is comprised of a transformer 40, an input side circuit 41 (as the switching section), an output side circuit 42, and a control circuit 43. Thus, the DC-DC converter 4 according to the fourth exemplary embodiment decreases the DC voltage supplied from the battery B4, and supplies the decreased voltage to the electronic device 54 while the input side circuit 41 is insulated from the output side circuit 42.

The transformer 40 is comprised of a primary winding 400, a secondary winding 401 and a secondary winding 402. That is, the transformer 40 used in the DC-DC converter 4 has the same structure of the transformer 10 used in the DC-DC converter 1 according to the first exemplary embodiment. The input side circuit 41 is comprised of switching elements 410, 411, 412 and 413. The input side circuit 41 has the same structure of the input side circuit 11 used in the DC-DC converter 1 according to the first exemplary embodiment.

The output side circuit 42 is comprised of a diode 420, a diode 421, a coil 422 and a capacitor 423. The output side circuit 42 has the same structure of the input side circuit 12 used in the DC-DC converter 1 according to the first exemplary embodiment.

The control circuit 43 is comprised of an output voltage detection section 430, a reference current value calculation section 431, an input current detection section 432 (as a current detection section), a reference signal generation section 433, a reset signal generation section 434, PWM signal recognition sections 438a and 483b (as a first drive section), a PWM signal generation section 435a (as the first drive section), a PWM signal generation section 435b (as a second drive section), a drive circuit 436a (as a first drive section) and a drive circuit 436b (as a second drive section).

The output voltage detection section 430, the reference current value calculation section 431, the input current detection section 432 and the reset signal generation section 434 have the same structure of the output voltage detection section 130, the reference current value calculation section 131, the input current detection section 132 and the reset signal generation section 134, respectively used in the DC-DC converter 1 according to the first exemplary embodiment.

The reference signal generation section 433 generates the reference signals CLK1, CLK2 and CLK3. The reference signal CLK1 (first reference signal) is used for generating the PWM signals PWM1H and PWM1L (first drive signals). On the other hand, the reference signal CLK2 (second reference signal) is used for generating the PWM signals PWM2H and PWM2L (as the second drive signals) when the reset signal generation section 434 does not generate the reset signal RST. The reference signal CLK3 is used for generating the reset signal RST. As shown in FIG. 9, the reference signal generation section 433 is connected to the reset signal generation section 434 and the PWM signal generation sections 435a and 435b, respectively.

The PWM signal recognition section 438a generates and outputs a PWM signal recognition signal PWM2H_CK on the basis of the PWM signal PWM2H. The PWM signal recognition signal PWM2H_CK is used for detecting the output of the PWM signal PWM2H. As shown in FIG. 9, the PWM signal recognition section 438a is connected to the PWM signal generation section 435a and the PWM signal generation section 435b, respectively.

The PWM signal recognition section 438b generates and outputs a PWM signal recognition signal PWM2L_CK on the basis of the PWM signal PWM2L. The PWM signal recognition signal PWM2L_CK is used for detecting the output of the PWM signal PWM2L. As shown in FIG. 9, the PWM signal recognition section 438b is connected to the PWM signal generation section 435a and the PWM signal generation section 435b, respectively.

The PWM signal generation section 435a generates and outputs the PWM signals PWM1H and PWM1L on the basis of the reference signals CLK1 and the PWM signal recognition signals PWM2H_CK and PWM2L_CK. The PWM signals PWM1H and PWM1L, are used for executing the switching of the switching elements 410 and 411. As shown in FIG. 9, the PWM signal generation section 435a is connected to the reference signal generation section 433 and the PWM signal recognition sections 438a and 483b. Further, the PWM signal generation section 435a is connected to the drive circuit 436a.

The PWM signal generation section 435b and the drive circuits 436a and 436b have the same structure of the PWM signal generation section 135b and the drive circuits 136a and 136b, respectively, in the DC-DC converter 1 according to the first exemplary embodiment.

A description will now be given of the operation of the DC-DC converter 4 according to the fourth exemplary embodiment with reference to FIG. 9 and FIG. 10. FIG. 10 is a view showing a timing chart for explaining the operation of the DC-DC converter 4 shown in FIG. 9.

The output voltage detection section 430, the reference current value calculation section 431 and the input current detection section 432 in the DC-DC converter 4 shown in FIG. 9 execute the same operation of the output voltage detection section 130, the reference current value calculation section 131 and the input current detection section 132, respectively in the DC-DC converter 1 shown in FIG. 1.

Figure 10:
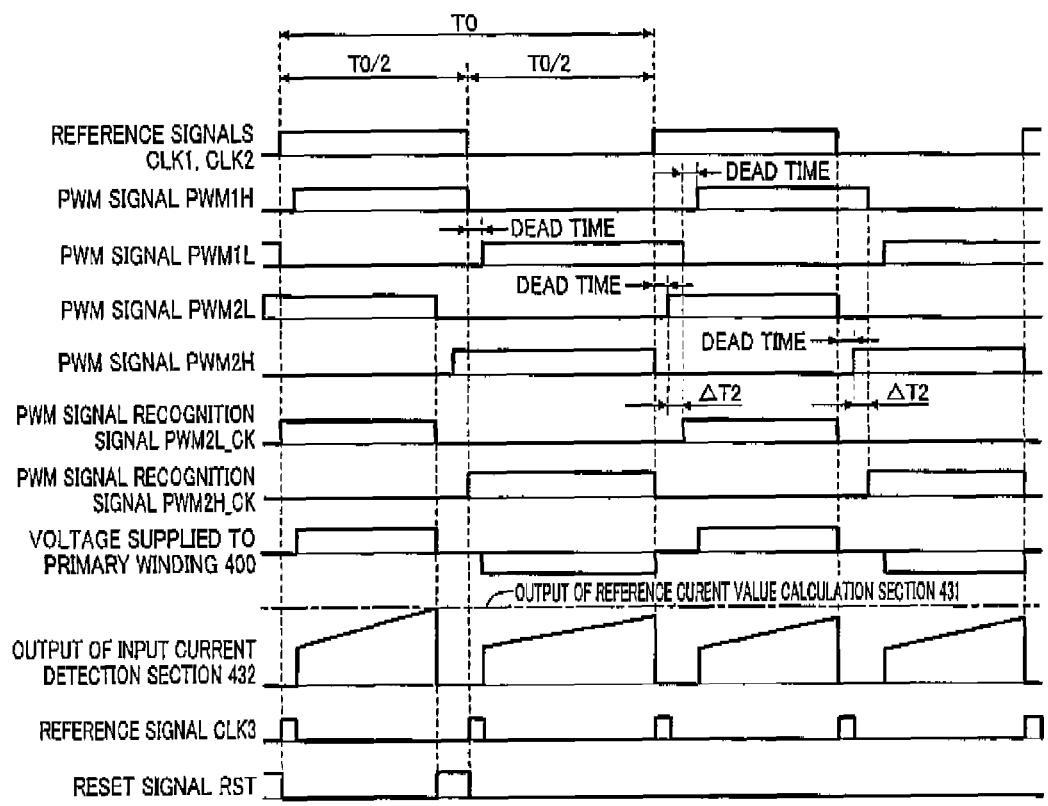
FIG. 10 is a view showing a timing chart for explaining the operation of the DC-DC converter shown in FIG. 9.

As shown in FIG. 10, the reference signal generation section 433 generates and outputs the reference signals CLK1, CLK2 and CLK3. Specifically, the reference signal generation section 433 generates and outputs the reference signal CLK1 by the same method of the reference signal generation section 133 in the DC-DC converter 1 shown in FIG. 1. However, the reference signal generation section 433, which is different from the operation of the reference signal generation section 133, outputs the reference signal CLK2 which is the same as the reference signal CLK1. Further, the reference signal generation section 433 generates and outputs the reference signal CLK3 by the same method of the reference signal generation section 133 in the DC-DC converter 1 shown in FIG. 1.

As shown in FIG. 10, the PWM signal recognition section 438a shown in FIG. 9 generates and outputs the PWM signal recognition signal PWM2H_CK which is delayed by ΔT2 from a rising timing of the PWM signal PWM2H. The PWM signal recognition section 438b shown in FIG. 9 generates and outputs the PWM signal recognition signal PWM2L_CK which is delayed by ΔT2 from a rising timing of the PWM signal PWM2L. The time length ΔT2 is set to be longer than the on-delay time of each of the switching elements 412 and 413.

As shown in FIG. 10, the PWM signal generation section 435a shown in FIG. 9 sets the PWM signal PWM1H to a low level at a rising timing of the reference signal CLK1 when the PWM signal recognition signal PWM2H_CK has a high level at a rising timing of the reference clock CLK1. When the PWM signal recognition signal PWM2H_CK has a low level, the PWM signal generation section 435a sets the PWM signal PWM1H to a low level at a rising timing of the PWM signal recognition signal PWM2H_CK.

When the PWM signal recognition signal PWM2L_CK has a high level, the PWM signal generation section 435a sets PWM signal PWM1L to a low level at a rising timing of the reference clock CLK1. When the PWM signal recognition signal PWM2L_CK has a low level, the PWM signal generation section 435a sets PWM signal PWM1L to a low level at a rising timing of the PWM signal recognition signal PWM2L_CK. That is, the PWM signal generation section 435a delays the timing at which each of the switching elements 410 and 411 is turned off from a turned-on state thereof, on the basis of a timing at which each of the PWM signals PWM1H and PWM1L is inverted. The PWM signals PWM1H and PWM1L are used for turning on the switching elements 412 and 413, respectively, from a turned-off state thereof.

Further, the timing at which each of the PWM signals PWM1H and PWM1L, is inverted is delayed from a timing at which each of the PWM signals PWM2H and PWM2L is inverted after the elapse of the on-delay time of each of the switching elements 412 and 413, where the switching elements 410 and 411 are turned off from a turned-on state thereof at the inverted timing of the PWM signals PWM1H and PWM1L, respectively, and the switching elements 412 and 413 are turned on from a turned-off state thereof at the inverted timing of the PWM signals PWM2H and PWM2L, respectively.

The PWM signal generation section 435b and the drive circuits 436a and 436b in the DC-DC converter 4 according to the fourth exemplary embodiment shown in FIG. 9 execute the same operation of the PWM signal generation section 135b and the drive circuits 136a and 136b, respectively, in the DC-DC converter 1 according to the first exemplary embodiment shown in FIG. 1.

The DC-DC converter 4 according to the fourth exemplary embodiment having the structure shown in FIG. 9 decreases a DC voltage supplied from the battery B4 by using the transformer 400 which is insulated between the input side circuit 41 and the output side circuit 42. The DC-DC converter 4 can supply the decreased DC voltage to the electronic device S4 mounted to a motor vehicle (not shown).

Next, a detailed explanation will now be given of generating the PWM signals PWM1H and PWM1L and the PWM signals PWM2H and PWM2L.

The PWM signal recognition section 438b detects whether or not the time length ΔT2 counted from the rising timing of the PWM signal PWM2L has elapsed. When the detection result indicates affirmation, namely indicates that the time length ΔT2 counted from the rising timing of the PWM signal PWM2L has elapsed, the PWM signal recognition section 438b sets the PWM signal recognition signal PWM2L_CK to a high level.

After this, the PWM signal generation section 435a detects whether or not the PWM signal recognition signal PWM2L_CK has a high level and the reference signal CLK1 has a high level. When the detection result indicates affirmation, namely, indicates that the PWM signal recognition signal PWM2L_CK has a high level and the reference signal CLK1 has a high level, the PWM signal generation section 435a sets the PWM signal PWM1L to a low level. After this, the PWM signal generation section 435a sets the PWM signal PWM1H to a high level after the elapse of the dead time counted from the timing at which the PWM signal PWM1L is set to a low level.

The reset signal generation section 434 detects whether or not the reference signal CLK3 is rising. When the detection result indicates affirmation, namely, indicates that the reference signal CLK3 has risen, the reset signal generation section 434 sets the reset signal RST to a low level.

After this, the PWM signal generation section 435b detects whether or not the PWM signal PWM2L has a high level and the reset signal RST has a high level, or whether or not the reference signal CLK2 is a low level. When the detection result indicates affirmation, namely, indicates that the PWM signal PWM2L has a high level and the reset signal RST has a high level or the reference signal CLK2 has a low level, the PWM signal generation section 435b sets the PWM signal PWM2L to a low level. After this, the PWM signal recognition section 438b sets the PWM signal recognition signal PWM2L_CK to a low level.

The PWM signal generation section 435b sets the PWM signal PWM2H to a high level after the elapse of the dead time counted from the timing at which the PWM signal PWM2L is set to a low level.

The PWM signal recognition section 438a detects whether or not the time length ΔT2 counted from the rising timing of the PWM signal PWM2H has elapsed. When the detection result indicates affirmation, namely indicates that the time length ΔT2 counted from the rising timing of the PWM signal PWM2H has elapsed, the PWM signal recognition section 438a sets the PWM signal recognition signal PWM2H_CK to a high level.

After this, the PWM signal generation section 435a detects whether or not the PWM signal recognition signal PWM2H_CK has a high level and the reference signal CLK1 has a low level. When the detection result indicates affirmation, namely, indicates that the PWM signal recognition signal PWM2H_CK has a high level and the reference signal CLK1 has a low level, the PWM signal generation section 435a sets the PWM signal PWM1H to a low level. After this, the PWM signal generation section 435a sets the PWM signal PWM1L to a high level after the elapse of the dead time counted from the timing at which the PWM signal PWM1H is set to a low level.

The reset signal generation section 434 detects whether or not the reference signal CLK3 is rising. When the detection result indicates affirmation, namely, indicates that the reference signal CLK3 has risen, the reset signal generation section 434 sets the reset signal RST to a low level.

After this, the PWM signal generation section 435b detects whether or not the PWM signal PWM2H has a high level and the reset signal RST has a high level, or whether or not the reference signal CLK2 is a high level. When the detection result indicates affirmation, namely, indicates that the PWM signal PWM2H has a high level and the reset signal RST has a high level or the reference signal CLK2 has a high level, the PWM signal generation section 435b sets the PWM signal PWM2H to a low level. As a result, the PWM signal recognition section 438a sets the PWM signal recognition signal PWM2H_CK to a low level. The PWM signal generation section 435b sets the PWM signal PWM2L to a high level after the elapse of the dead time counted from the timing at which the PWM signal PWM2H is set to a low level. The operation flow returns to the start process in the DC-DC converter 4 according to the fourth exemplary embodiment. As previously described, in the start process of the DC-DC converter 4, the PWM signal recognition section 438b detects whether or not the time length ΔT2 counted from the rising timing of the PWM signal PWM2L has elapsed.

Next, a description will now be given of the effects of the DC-DC converter 4 according to the fourth exemplary embodiment.

As shown in FIG. 9, the DC-DC converter 4 according to the fourth exemplary embodiment uses the reference signal CLK2 which is the same of the reference signal CLK1. The PWM signal recognition section 438a, the PWM signal recognition section 438b, the PWM signal generation section 435a and the PWM signal generation section 435b delay the timing, at which each of the PWM signals PWM1H and PWM1L is inverted, on the basis of the timing at which each of the PWM signal PWM2H and the PWM signal PWM2L is inverted. In this case, the PWM signals PWM2H and PWM2L are used for turning on the switching elements 412 and 413 from a turned-off state thereof, and the PWM signals PWM1H and PWM1L are used for turning off the switching elements 410 and 411 from a turned-on state thereof.

Accordingly, even if the reset signal RST is not output, it is possible for each of the PWM signals PWM1H, PWM1L, PWM2H and PWM2L to have a different timing at which the level thereof is inverted. This makes it possible to avoid the switching elements diagonally arranged in the input side circuit 41 as the switching section from being turned on or off simultaneously, even if the reset signal RST is not output. This makes it possible to suppress the switching loss and to increase the efficiency as compared with the efficiency of a conventional structure in which switching elements diagonally arranged are turned on and off simultaneously, namely at the same timing.

In the DC-DC converter 4 according to the fourth exemplary embodiment, it is set so that the time length ΔT2 is longer than the on-delay time of each of the switching elements 412 and 413. Accordingly, the timing at which each of the PWM signals PWM1H and PWM1L is inverted is delayed from a timing at which each of the PWM signals PWM2H and PWM2L is inverted after the elapse of the on-delay time of each of the switching elements 412 and 413, where the switching elements 410 and 411 are turned off from a turned-on state thereof at the inverted timing of the PWM signals PWM1H and PWM1L, respectively, and the switching elements 412 and 413 are turned on from a turned-off state thereof at the inverted timing of the PWM signals PWM2H and PWM2L, respectively. This structure and operation make it possible to avoid the switching elements diagonally arranged in the input side circuit 41 as the switching section from being turned on and off simultaneously, namely at the same timing.

Fifth Exemplary Embodiment

A description will be given of a DC-DC converter 5 as a voltage conversion device according to a fifth exemplary embodiment with reference to FIG. 11 and FIG. 12.

Figure 11:
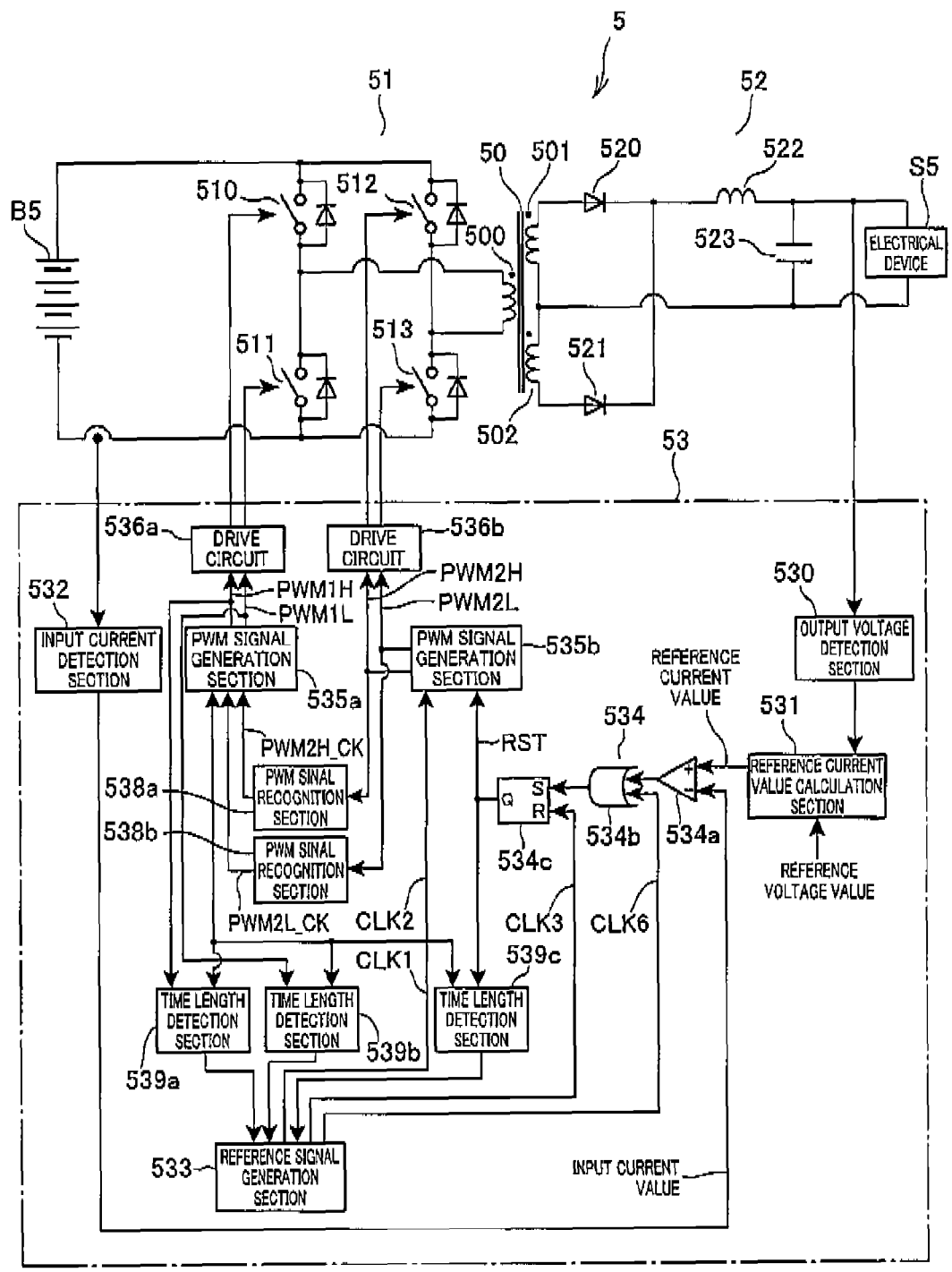
FIG. 11 is a view showing a circuit configuration of a DC-DC converter according to a fifth exemplary embodiment of the present invention.

FIG. 11 is a view showing a circuit configuration of the DC-DC converter 5 according to the fourth exemplary embodiment. The DC-DC converter 5 according to the fifth exemplary embodiment detects a time length counted form a timing at which the reference signal CLK1 is inverted to a timing at which each of the PWM signals PWM1H and PWM1L is inverted, where the PWM signals PWM1H and PWM1L are used for turning off the switching elements from a turned on state thereof. The DC-DC converter 5 forwards the timing at which each of the PWM signals PWM2H and PWM2L is inverted on the basis of the detected time length, where the PWM signals PWM2H and PWM2L are used for turning off the switching elements from a turned on state thereof.

A description will now be given of the structure of the DC-DC converter 5 according to the fifth exemplary embodiment with reference to FIG. 11.

The DC-DC converter 5 (as the electric power conversion device) shown in FIG. 11 is a full bridge type converter for decreasing the DC voltage supplied from a battery B5, and a decreased voltage is supplied to the electronic device S5 mounted to a motor vehicle. The DC voltage supplied from the battery B5 is insulated from the electronic device S5. The DC-DC converter 5 is comprised of a transformer 50, an input side circuit 51 (as the switching section), an output side circuit 52, and a control circuit 53. Thus, the DC-DC converter 5 according to the fourth exemplary embodiment decreases the DC voltage supplied from the battery B5, and supplies the decreased voltage to the electronic device S4 while the input side circuit 51 is insulated from the output side circuit 52.

The transformer 50 is comprised of a primary winding 500, a secondary winding 501 and a secondary winding 502. That is, the transformer 50 used in the DC-DC converter 5 has the same structure of the transformer 40 used in the DC-DC converter 4 according to the fourth exemplary embodiment.

The input side circuit 51 is comprised of switching elements 510, 511, 512 and 513. The input side circuit 51 has the same structure of the input side circuit 41 used in the DC-DC converter 4 according to the fourth exemplary embodiment. The output side circuit 52 is comprised of a diode 520, a diode 521, a coil 522 and a capacitor 523. The output side circuit 52 in the DC-DC converter 5 according to the fifth exemplary embodiment has the same structure of the input side circuit 42 used in the DC-DC converter 4 according to the fourth exemplary embodiment.

The control circuit 53 is comprised of an output voltage detection section 530, a reference current value calculation section 31, an input current detection section 532 (as the current detection section), a reference signal generation section 533 (as the second drive section), a reset signal generation section 534 (as the second drive section), PWM signal recognition sections 538a and 583b, time length detection sections 539a, 539b and 539c (as the second drive section), a PWM signal generation section 535a (as the first drive section), a PWM signal generation section 535b (as the second drive section), a drive circuit 536a (as the first drive section), and a drive circuit 536b (as the second drive section).

The output voltage detection section 530, the reference current value calculation section 531, and the input current detection section 532 in the DC-DC converter 5 according to the fifth exemplary embodiment have the same structure of the output voltage detection section 430, the reference current value calculation section 431 and the reset signal generation section 434, respectively used in the DC-DC converter 4 according to the fourth exemplary embodiment.

The reference signal generation section 533 generates the reference signals CLK1, CLK2, CLK3 and CLK6. The reference signal CLK1 (as the first reference signal) is used for generating the PWM signals PWM1H and PWM1L (as the first drive signals). On the other hand, the reference signal CLK2 (as the second reference signal) is used for generating the PWM signals PWM2H and PWM2L (as the second drive signals) when the reset signal generation section 534 does not generate the reset signal RST. The reference signal CLK3 is used for generating the reset signal RST. When the output timing of the reset signal RST is adjusted, the reference signal CLK6 is used for adjusting a timing at which each of the PWM signals PWM2H and PWM2L is inverted. As shown in FIG. 11, the reference signal generation section 533 is connected to the reset signal generation section 534, the PWM signal generation sections 535a and 535b and the time length detection sections 539a, 539b and 539c, respectively.

The reset signal generation section 534 generates and outputs the reset signal RST on the basis of the reference current value, the input current value and the reference signals CLK3 and CLK6. The reset signal generation section 534 is comprised of a comparison unit 534a, a OR circuit 534b and a latch circuit 534c. The reset signal generation section 534 is different in structure from the reset signal generation section 434 in the DC-DC converter 4 according to the fourth exemplary embodiment, but has the same structure of the reset signal generation section 234 in the DC-DC converter 2 according to the second exemplary embodiment.

The PWM signal recognition sections 538a and 583b have the same structure of the PWM signal recognition sections 438a and 483b in the DC-DC converter 4 according to the fourth exemplary embodiment.

The time length detection section 539a detects a time length α counted from a timing at which the reference signal CLK1 is fallen to a timing at which the PWM signal PWM1H is fallen. The time length detection section 539a is connected to the reference signal generation section 533 and the PWM signal generation section 535a.

The time length detection section 539b detects a time length β counted from a timing at which the reference signal CLK1 is rising to a timing at which the PWM signal PWM1L is fallen. The time length detection section 539b is connected to the reference signal generation section 533 and the PWM signal generation section 535a.

The time length detection section 539c detects a time length ΔT3L and a time length ΔT3H. The time length ΔT3L is counted from a timing at which the reference signal is rising to a timing at which the PWM signal PWM2L is fallen. The time length ΔT3H is counted from a timing at which the reference signal CLK1 is fallen to a timing at which the PWM signal PWM2H is fallen. The time length detection section 539c is connected to the reference signal generation section 533 and a Q output terminal of the latch circuit 534, respectively.

The PWM signal generation sections 535a and 535b, and the drive circuits 536a and 536b in the DC-DC converter 5 according to the fifth exemplary embodiment have the same structure of the PWM signal generation sections 435a and 435b, and the drive circuits 436a and 436b in the DC-DC converter 4 according to the fourth exemplary embodiment.

A description will now be given of the operation of the DC-DC converter 5 according to the fifth exemplary embodiment with reference to FIG. 11 and FIG. 12.

Figure 12:
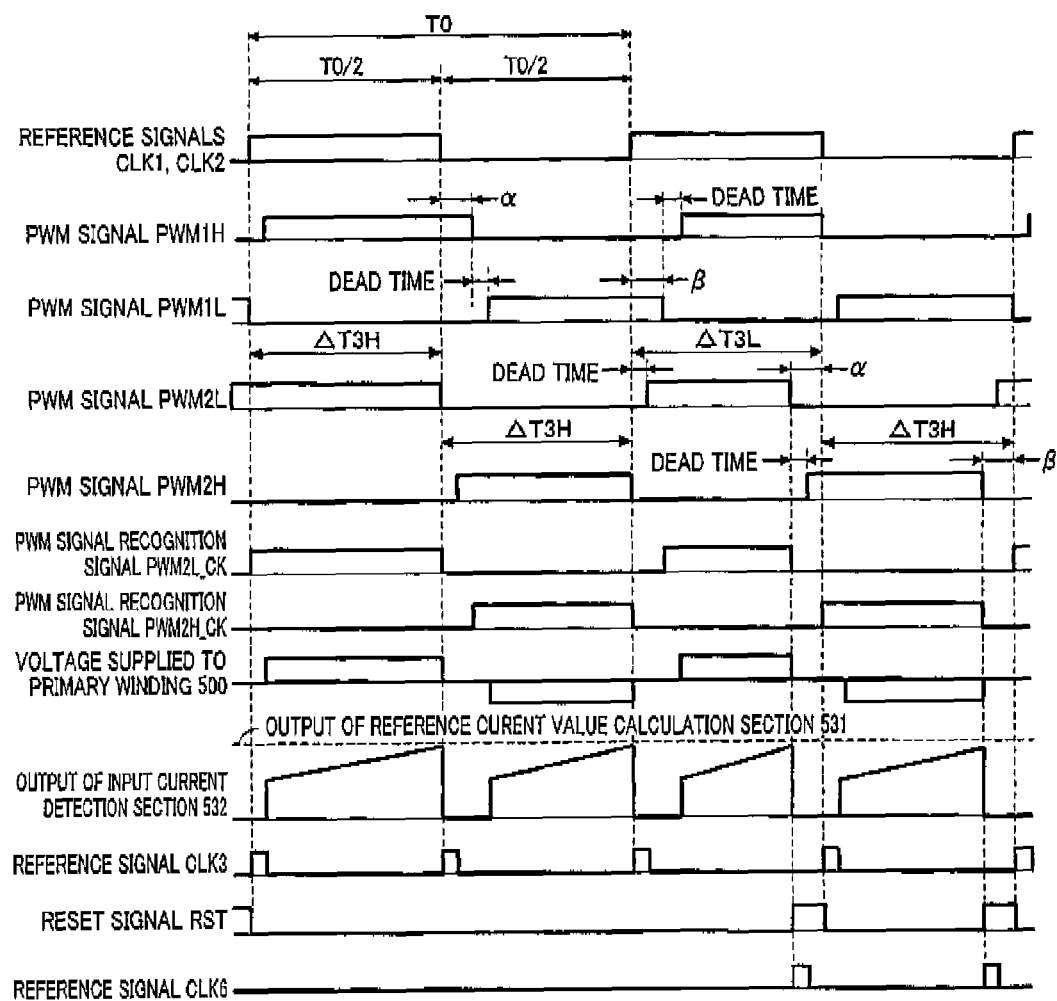
FIG. 12 is a view showing a timing chart for explaining the operation of the DC-DC converter shown in FIG. 11.

FIG. 12 is a view showing a timing chart for explaining the operation of the DC-DC converter 5 according to the fifth exemplary embodiment shown in FIG. 11.

The output voltage detection section 530, the reference current value calculation section 531 and the input current detection section 532 in the DC-DC converter 5 shown in FIG. 11 execute the same operation of the output voltage detection section 430, the reference current value calculation section 431 and the input current detection section 432, respectively in the DC-DC converter 4 shown in FIG. 9.

The reference signal generation section 533 generates and outputs the reference signals CLK1, CLK2, CLK3 and CLK6. Specifically, as shown in FIG. 12, the reference signal generation section 533 generates and outputs the reference signals CLK1, CLK2 and CLK3 which are the same of the reference signals CLK1, CLK2 and CLK3 generated by the method of the reference signal generation section 433 in the DC-DC converter 4 shown in FIG. 9. The reference signal generation section 533 generates and outputs the reference signal CLK6 on the basis of the detection results obtained by the time length detection sections 539a, 539b and 539c.

As shown in FIG. 12, the PWM signal recognition sections 538a and 538b shown in FIG. 11 generate and output the PWM signal recognition signals PWM2H_CK and PWM2L_CK which are the same of the PWM signal recognition signals PWM2H_CK and PWM2L_CK generated by the PWM signal recognition sections 438a and 438b in the DC-DC converter 4 according to the fourth exemplary embodiment.

Similarly, as shown in FIG. 12, the PWM signal generation sections 535a and 535b shown in FIG. 11 generate and output the PWM signals PWM1H, PWM1L, PWM2H and PWM2L which are the same of the PWM signals PWM1H, PWM1L, PWM2H and PWM2L generated by the PWM signal generation sections 43a and 435b in the DC-DC converter 4 according to the fourth exemplary embodiment.

When the reference signal generation section 533 does not output the reference signal CLK6, the DC-DC converter 5 shown in FIG. 11 and the DC-DC converter shown in FIG. 9 have the same operation.

The time length detection section 539a detects the time length α counted from a timing at which the reference signal CLK1 is fallen to a timing at which the PWM signal PWM1H is fallen.

The time length detection section 539b detects the time length β counted from a timing at which the reference signal CLK1 is rising to a timing at which the PWM signal PWM1L is fallen.

The time length detection sections 539c detects a time length counted from a timing at which the reference signal CLK1 is rising to a timing at which the reference signal CLK2, which is equal to the reference signal CLK1, is fallen, or to a timing at which the reset signal RST is rising. On the basis of these detected time length, the time length detection sections 539c then detects the time length ΔT3L counted from the timing at which the reference clock CLK1 is rising to the timing at which the PWM signal PWM2L is fallen. Further, the time length detection sections 539c detects a time length counted from a timing at which the reference signal CLK1 is fallen to a timing at which the reference signal CLK2. The reference signal CLK 2 is equal to the reference signal CLK1, or to a timing at which the reset signal RST is rising. On the basis of these detected time length, the time length detection sections 539c detects the time length ΔT3H counted from the timing at which the reference clock CLK1 is fallen to the timing at which the PWM signal PWMH is fallen.

The reference signal generation section 533 generates and outputs the reference signal CLK6 on the basis of the time length α, the time length β, the time length ΔT3L and the time length ΔT3H. Specifically, as shown in FIG. 12, the reference signal generation section 533 generates and outputs the reference signal CLK6 having a high level for a predetermined time length after the elapse of the time length (ΔT3H-α) counted from a rising timing of the reference signal CLK1 when the time length α is not zero. In addition, the reference signal generation section 533 generates and outputs the reference signal CLK6 having a high level for a predetermined time length after the elapse of the time length (ΔT3H-β) counted from a falling timing of the reference signal CLK1 when the time length β is not zero.

The reset signal generation section 534 generates and outputs the reset signal RST having a high level at a rising timing of the reference signal CLK6 and a low level at a rising timing of the reference signal CLK3.

The PWM signal generation sections 535a and 535b in the DC-DC converter 5 according to the fifth exemplary embodiment execute the same operation of the PWM signal generation sections 435a and 435b, respectively in the DC-DC converter 4 according to the fourth exemplary embodiment. As a result, the PWM signal generation sections 535a and 535b generate and output the PWM signal, a falling timing of which is brought forward to the time length β to the PWM signal PWM2H output immediately before. Further, the PWM signal generation sections 535a and 535b generate and output the PWM signal, a falling timing of which is brought forward by the time length α to the PWM signal PWM2L output immediately before. That is, the PWM signal generation sections 535a and 535b detect a time length counted from a timing, at which the reference signal CLK1 is inverted, to a timing at which each of the PWM signals PWM1H and PWM1L is inverted, where the PWM signals PWM1H and PWM1L are used for turning of the switching elements 510 and 511 from a turned on state thereof. The PWM signal generation sections 535a and 535b forward the inverting timing of the PWM signals PWM2H and PWM2L on the basis of the detected time length, where the PWM signals PWM2H and PWM2L are used for turning off the switching elements 512 and 513 from a turned on state thereof.

The drive circuits 536a and 536b execute the same operation of the drive circuits 436a and 436b in the DC-DC converter 4 according to the fourth exemplary embodiment.

The DC-DC converter 5 according to the fifth exemplary embodiment having the structure shown in FIG. 11 decreases a DC voltage supplied from the battery B5 by using the transformer 500 which is insulated between the input side circuit 51 and the output side circuit 52. The DC-DC converter 5 can supply the decreased DC voltage to the electronic device S5 mounted to a motor vehicle (not shown).

Next, a description will now be given of a detailed explanation of generating the PWM signals PWM1H and PWM1L and the PWM signals PWM2H and PWM2L.

The PWM signal recognition section 538b detects whether or not the time length ΔT2 counted from the rising timing of the PWM signal PWM2L has elapsed. When the detection result indicates affirmation, namely indicates that the time length ΔT2 counted from the rising timing of the PWM signal PWM2L has elapsed, the PWM signal recognition section 538b sets the PWM signal recognition signal PWM2L_CK to a high level.

After this, the PWM signal generation section 535a detects whether or not the PWM signal recognition signal PWM2L_CK has a high level and the reference signal CLK1 has a high level. When the detection result indicates affirmation, namely, indicates that the PWM signal recognition signal PWM2L_CK has a high level and the reference signal CLK1 has a high level, the PWM signal generation section 535a sets the PWM signal PWM1L to a low level. The time length detection section 539a detects the time length β counted from the rising timing of the reference signal CLK1 to the falling timing of the PWM signal PWM1L. After this, the PWM signal generation section 535a sets the PWM signal PWM1L to a low level. The PWM signal generation section 535a sets the PWM signal PWM1H to a high level after the elapse of the dead time counted from the timing at which the PWM signal PWM1L is set to a low level.

The reset signal generation section 534 detects whether or not the reference signal CLK3 is rising. When the detection result indicates affirmation, namely, indicates that the reference signal CLK3 has risen, the reset signal generation section 534 sets the reset signal RST to a low level.

After this, the PWM signal generation section 535b detects whether or not the PWM signal PWM2L has a high level and the reset signal RST has a high level, or whether or not the reference signal CLK2 is a low level. When the detection result indicates affirmation, namely, indicates that the PWM signal PWM2L has a high level and the reset signal RST has a high level, or the reference signal CLK2 does not have a low level, the reset signal generation section 534 detects whether or not the reference signal CLK6 is rising. When the detection result indicates affirmation, namely, indicates that the reference signal CLK6 has risen, the reset signal generation section 534 sets the reset signal RST to a high level.

On the other hand, when the detection result indicates negation, namely, indicates that the reference signal CLK6 has not risen, the operation flow returns to the process of detecting whether or not the PWM signal PWM2L has a high level and the reset signal RST has a high level or the reference signal CLK2 has a low level.

When the detection result indicates affirmation, namely, indicates that the PWM signal PWM2L has a high level and the reset signal RST has a high level or the reference signal CLK2 has a low level, the PWM signal generation section 535b sets the PWM signal PWM2L to a low level. After this, the PWM signal recognition section 538b sets the PWM signal recognition signal PWM2L_CK to a low level. Further, the PWM signal generation section 535b sets the PWM signal PWM2H to a high level after the elapse of the dead time counted from the timing at which the PWM signal PWM2L is set to a low level.

The PWM signal recognition section 538a detects whether or not the time length ΔT2 counted from the rising timing of the PWM signal PWM2H has elapsed. When the detection result indicates affirmation, namely indicates that the time length ΔT2 counted from the rising timing of the PWM signal PWM2H has elapsed, the PWM signal recognition section 538a sets the PWM signal recognition signal PWM2H_CK to a high level.

After this the PWM signal generation section 535a detects whether or not the PWM signal recognition signal PWM2H_CK has a high level and the reference signal CLK1 has a low level. When the detection result indicates affirmation, namely, indicates that the PWM signal recognition signal PWM2H_CK has a high level and the reference signal CLK1 has a low level, the PWM signal generation section 535a sets the PWM signal PWM1H to a low level. The time length detection section 539a detects the time length α counted from a timing at which the reference signal CLK1 is fallen to a timing at which the PWM signal PWM1H is fallen. After this, the PWM signal generation section 535a sets the PWM signal PWM1L to a high level after the elapse of the dead time counted from the timing at which the PWM signal PWM1H is set to a low level.

The reset signal generation section 534 detects whether or not the reference signal CLK3 is rising. When the detection result indicates affirmation, namely, indicates that the reference signal CLK3 has risen, the reset signal generation section 534 sets the reset signal RST to a low level.

After this, the PWM signal generation section 535b detects whether or not the PWM signal PWM2H has a high level and the reset signal RST has a high level, or whether or not the reference signal CLK2 is a high level. When the detection result indicates affirmation, namely, indicates that the PWM signal PWM2H has a high level and the reset signal RST has a high level or the reference signal CLK2 does not have a high level, the reset signal generation section 534 detects whether or not the reference signal CLK6 is rising. When the detection result indicates affirmation, namely, indicates that the reference signal CLK6 has risen, the reset signal generation section 534 sets the reset signal RST to a high level.

On the other hand, when the detection result indicates negation, namely, indicates that the reference signal CLK6 has not risen, the operation flow returns to the process of detecting whether or not the PWM signal PWM2L has a high level and the reset signal RST has a high level or the reference signal CLK2 has a high level. When the detection result indicates affirmation, namely, indicates that the PWM signal PWM2H has a high level and the reset signal RST has a high level, or the reference signal CLK2 has a high level, the PWM signal generation section 535b sets the PWM signal PWM2H to a low level. After this, the PWM signal recognition section 538a sets the PWM signal recognition signal PWM2H_CK to a low level. The PWM signal generation section 535b sets the PWM signal PWM2L to a high level after the elapse of the dead time counted from the timing at which the PWM signal PWM2H is set to a low level. The operation flow returns to the start process of the DC-DC converter 5 according to the fifth exemplary embodiment.

Next, a description will now be given of the effects of the DC-DC converter 5 according to the fifth exemplary embodiment.

In the DC-DC converter 5 according to the fifth exemplary embodiment shown in FIG. 12, the time length detection sections 539a, 539b and 539c, the reference signal generation section 533, the reset signal generation section 534, the PWM signal generation section 535b and the drive circuit 536a detect the time length α and the time length β counted from the timing at which the reference signal CLK1 is inverted to the timing at which each of the PWM signals PWM1H and PWM1L is inverted, where the PWM signals PWM1H and PWM1L are used for turning off from a turned-on state thereof. The sections 539a, 539b and 539c, 533, 534, 535b and 536 forward the time length α and the time length β on the basis of the detected timings. As a result, even if the falling timing of the PWM signals PWM1H and PWM1L is shifted from the timing at which the reference signal CLK1 is inverted, it is possible to promptly make a synchronization state between the PWM signals PWM1H and PWM1L and the inverting timing of the reference clock signal CLK1. This makes it possible to avoid switching elements diagonally arranged in the input side circuit 51 as the switching section from being turned on and off simultaneously. It is possible for the DC-DC converter 5 according to the fifth exemplary embodiment to have an increased and improved efficiency.

(Various Modifications)

The DC-DC converter according to each of the first exemplary embodiment to the fifth exemplary embodiment generates the reset signal RST on the basis of the input current supplied into the input side circuit, and drives the switching elements on the basis of the drive signals such as the PWM signals PWM1H and PWM1L and the PWM signals PWM2H and PWM2L, etc., generated on the basis of the reset signal RST. However the concept of the present invention is not limited by this. For example, it is possible to generate the reset signal RST and the drive signals such as the PWM1H and PWM1L and the PWM signals PWM2H and PWM2L, etc., on the basis of an input current and an output current in the output side circuit in order to drive the switching elements.

Further, each of the first to fifth exemplary embodiments discloses the DC-DC converter without a slope compensation for preventing a low-frequency oscillation phenomenon. However the concept of the present invention is not limited by this. For example, it is possible for the DC-DC converter according to each exemplary embodiment to have a function of preventing such a low-frequency oscillation phenomenon. In this case, it is possible to add a compensation value to be used in the slope compensation to a detected current value or a reference current value. Still further, it is possible to generate a reference current value by an analogue processing or a digital processing.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An electric power conversion device comprising:
a transformer comprised of a primary winding and secondary windings;
a switching section connected to the primary winding of the transformer and comprised of switching elements in which a first pair of switching elements connected in series are connected in parallel to a second pair of switching elements connected in series;

a reference signal generation section configured to generate a reference signal having a predetermined period and output the reference signal;

a current detection section configured to detect a current flowing in one of the transformer and the switching section;

a reset signal generation section configured to generate and output a reset signal when the current detected by the current detection section exceeds an instruction current value; and a driving section configured to generate drive signals, which are used for driving the first and second pair of switching elements, on a basis of the reset signal when the reset signal generation section outputs the reset signal, and to generate drive signals on a basis of the reference signal when the reset signal generation section does not output the reset signal, wherein the drive section comprises a first drive section and a second drive section, and the first drive section is configured to generate a first drive signal on a basis of a timing when a first reference signal is inverted, and to drive the first pair of the switching elements connected in series on a basis of a timing when the first drive signal is inverted, and the second drive section is configured to generate a second drive signal on a basis of the reset signal when the reset signal generation section outputs the reset signal, and on a basis of a timing at which a second reference signal is inverted, and the second drive section is configured to drive the second pair of the switching elements connected in series on a basis of a timing when the second drive signal is inverted.

2. The electric power conversion device according to claim 1, wherein the second reference signal is brought forward by a predetermined time length as compared with the first reference signal.

3. The electric power conversion device according to claim 1, wherein the second reference signal is equal to the first reference signal, and the reset signal generation section forcedly outputs the reset signal before a predetermined time length counted from the timing when the first reference signal is inverted.

4. The electric power conversion device according to claim 1, wherein the second reference signal is equal to the first reference signal, and the first drive section delays the timing, at which the first drive signal is inverted, by a predetermined time length when the reset signal generation section does not output the reset signal before the predetermined time counted from the timing when the first reference signal is inverted.

5. The electric power conversion device according to claim 2, wherein the predetermined time length is larger than a sum of a dead time and an on-delay time of the second pair of switching elements connected in series, where the dead time is used for turning off the switching elements simultaneously.

6. The electric power conversion device according to claim 1, wherein the second reference signal is equal to the first reference signal, and the first drive section delays the timing at which the first drive signal is inverted on the basis of a timing at which the second drive signal is inverted, where the switching element of the second pair is turned on from a turned-off state at the timing at which the second drive signal is inverted, and the switching element of the first pair is turned off from a turned-on state at the timing at which the first drive signal is inverted.

7. The electric power conversion device according to claim 6, wherein the second drive section detects a time length counted from a timing when the first reference signal is inverted to a timing when the first drive signal is inverted, and forwards a timing when the second drive signal is inverted on the basis of the detected time length, where the first drive signal is used for turning off the switching element of the first pair from a turned-on state, and the second drive signal is used for turning off the switching element of the second pair from a turned-on state.

8. The electric power conversion device according to claim 6, wherein the timing when the first drive signal is inverted is after an elapse of a turned-on delay time of the switching element of the first pair from the timing when the second drive signal is inverted, where the first drive signal is used for turning off the switching element of the first pair from a turned-on state, and the second drive signal is used for turning on the switching element of the second pair from a turned-off state.

9. The electric power conversion device according to claim 1, wherein the electric power conversion device is mounted to a motor vehicle.

10. The electric power conversion device according to claim 3, wherein the predetermined time length is larger than a sum of a dead time and an on-delay time of the second pair of switching elements connected in series, where the dead time is used for turning off the switching elements of the second pair simultaneously.

11. The electric power conversion device according to claim 4, wherein the predetermined time length is larger than a sum of a dead time and an on-delay time of the second pair of switching elements connected in series, where the dead time is used for turning off the switching elements of the second pair simultaneously.

12. The electric power conversion device according to claim 7, wherein the timing when the first drive signal is inverted is after an elapse of a turned-on delay time of the switching element of the first pair from the timing when the second drive signal is inverted, where the first drive signal is used for turning off the switching element of the first pair from a turned-on state, and the second drive signal is used for turning on the switching element of the second pair from a turned-off state.

* * * * *